(12) United States Patent
Murakami et al.

(10) Patent No.: US 11,211,804 B2
(45) Date of Patent: Dec. 28, 2021

(54) ELECTRICAL DEVICE

(71) Applicant: MAKITA CORPORATION, Anjo (JP)

(72) Inventors: Junichi Murakami, Anjo (JP); Junya Yamaguchi, Anjo (JP); Hideyuki Taga, Anjo (JP)

(73) Assignee: MAKITA CORPORATION, Anjo (JP)

( * ) Notice: Subject to any disclaimer, the term of this patent is extended or adjusted under 35 U.S.C. 154(b) by 168 days.

(21) Appl. No.: 16/808,025

(22) Filed: Mar. 3, 2020

(65) Prior Publication Data
US 2020/0303933 A1 Sep. 24, 2020

(30) Foreign Application Priority Data

Mar. 19, 2019 (JP) .............................. JP2019-051292
Nov. 18, 2019 (JP) .............................. JP2019-208166
Nov. 18, 2019 (JP) .............................. JP2019-208168
Jan. 15, 2020 (JP) .............................. JP2020-004567

(51) Int. Cl.
*H02J 7/00* (2006.01)
*H01M 10/44* (2006.01)
(Continued)

(52) U.S. Cl.
CPC ........... *H02J 7/0045* (2013.01); *H01M 10/44* (2013.01); *H01M 50/20* (2021.01);
(Continued)

(58) Field of Classification Search
CPC ...... H02J 7/0045; H02J 7/0044; H01M 50/20; H01M 50/543; H01M 10/44; H01M 2220/30; H01M 50/247; H01R 13/62; H01R 13/4534; H01R 13/40; H01R 13/502; Y02E 60/10
(Continued)

(56) References Cited

U.S. PATENT DOCUMENTS 6,502,949 B1   1/2003   Horiyama et al.
9,263,717 B2 *  2/2016   Nakano ............... H01M 50/543
(Continued)

FOREIGN PATENT DOCUMENTS

JP   2001-300867 A   10/2001
JP   2004-147360 A   5/2004
JP   2005-235472 A   9/2005

*Primary Examiner* — M Baye Diao
(74) *Attorney, Agent, or Firm* — Oliff PLC

(57) ABSTRACT

An electrical device may be provided with: a housing to which a battery pack is attached detachably by sliding the battery pack in a sliding direction; a battery connection terminal configured to be electrically connected to the battery pack attached to the housing; and a terminal cover configured to move between a protection position for protecting the battery connection terminal and an exposure position for exposing the battery connection terminal. The housing may include a cover rail extending along the sliding direction. The terminal cover may include: a cover body having a shape that at least partially covers the battery connection terminal; and a hook formed integrally with the cover body, and the hook is engaged with the cover rail so as to slide in the sliding direction.

11 Claims, 28 Drawing Sheets

(51) Int. Cl.
*H01R 13/62* (2006.01)
*H01M 50/20* (2021.01)
*H01M 50/543* (2021.01)

(52) U.S. Cl.
CPC .......... *H01M 50/543* (2021.01); *H01R 13/62* (2013.01); *H02J 7/0044* (2013.01); *H01M 2220/30* (2013.01)

(58) Field of Classification Search
USPC ....................................................... 320/107
See application file for complete search history.

(56) References Cited

U.S. PATENT DOCUMENTS

| | | |
|---|---|---|
| 9,368,765 B2 * | 6/2016 | Taga .................. H01R 13/5219 |
| 2004/0135542 A1 | 7/2004 | Ito |
| 2005/0017686 A1 | 1/2005 | Sakakibara et al. |
| 2007/0182373 A1 | 8/2007 | Sakakibara et al. |

* cited by examiner

ELECTRICAL DEVICE

CROSS-REFERENCE TO RELATED APPLICATION(S)

This application claims priority to Japanese Patent Application No. 2019-051292, filed on Mar. 19, 2019, Japanese Patent Application No. 2019-208166, filed on Nov. 18, 2019, Japanese Patent Application No. 2019-208168, filed on Nov. 18, 2019, and Japanese Patent Application No. 2020-004567, filed on Jan. 15, 2020, the entire contents of which are incorporated herein by reference.

TECHNICAL FIELD

The art disclosed herein relates to an electrical device.

BACKGROUND

Japanese Patent Application Publication No. 2004-147360 describes an electrical device. The electrical device includes: a housing to which a battery pack is detachably attached by sliding the battery pack in a sliding direction; a battery connection terminal to be electrically connected to the battery pack attached to the housing; and a terminal cover configured to move between a protection position for protecting the battery connection terminal and an exposure position for exposing the battery connection terminal. The housing includes a cover rail extending along the sliding direction. The terminal cover includes: a cover body having a shape that at least partially covers the battery connection terminal; a stopper having substantially a columnar shape formed integrally with the cover body; and a washer fixed to a tip of the stopper by a screw, and the stopper and the washer are engaged with the cover rail so as to slide in the sliding direction.

SUMMARY

In the electrical device of Japanese Patent Application Publication No. 2004-147360, work of screwing the washer to the stopper when assembling the terminal cover to the housing and assembling work and repairing work have been difficult to perform. In an electrical device including a terminal cover, an art by which assembling work and repairing work are facilitated is demanded.

The present teachings disclose an electrical device. The electrical device may comprise: a housing to which a battery pack is attached detachably by sliding the battery pack in a sliding direction: a battery connection terminal configured to be electrically connected to the battery pack attached to the housing; and a terminal cover configured to move between a protection position for protecting the battery connection terminal and an exposure position for exposing the battery connection terminal. The housing may include a cover rail extending along the sliding direction. The terminal cover may include: a cover body having a shape that at least partially covers the battery connection terminal; and a hook formed integrally with the cover body. The hook may be engaged with the cover rail so as to slide in the sliding direction.

According to the electrical device as aforementioned, the terminal cover can be assembled to the housing by engaging the hook, which is formed integrally with the cover body, with the cover rail. Since screwing work is not required when the terminal cover is to be assembled with the housing, the assembling work and repairing work can be performed easily.

DETAILED DESCRIPTION

Figure 1:
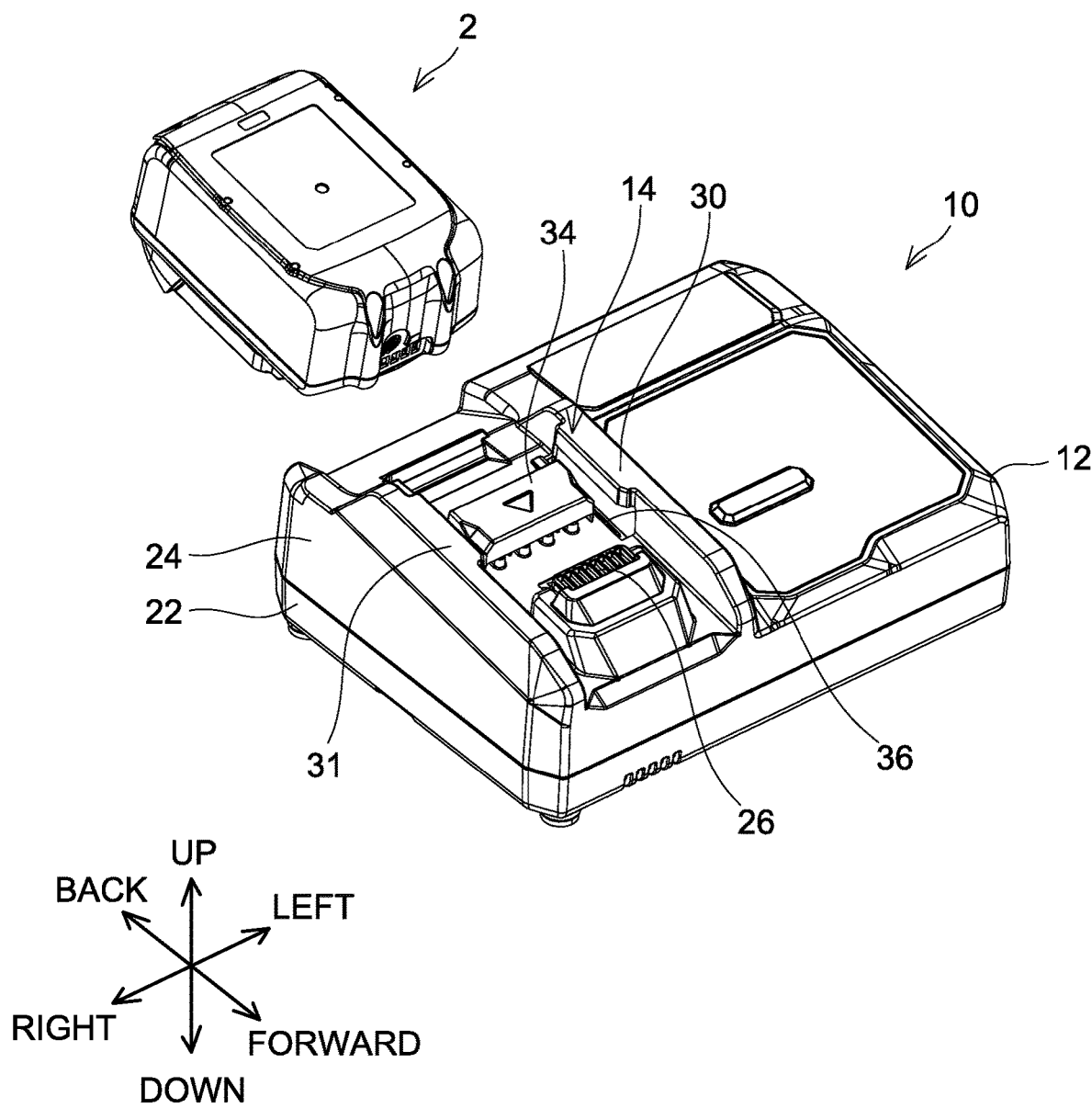
FIG. 1 is a perspective view showing a charger 10 of a first embodiment with a battery pack 2.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved electrical devices, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In some aspects of the present teachings, an electrical device may comprise: a housing to which a battery pack is attached detachably by sliding the battery pack in a sliding direction; a battery connection terminal configured to be electrically connected to the battery pack attached to the housing; and a terminal cover configured to move between a protection position for protecting the battery connection terminal and an exposure position for exposing the battery connection terminal. The housing may include a cover rail extending along the sliding direction. The terminal cover may include: a cover body having a shape that at least partially covers the battery connection terminal; and a hook formed integrally with the cover body. The hook may be engaged with the cover rail so as to slide in the sliding direction.

According to the above electrical device, the terminal cover can be assembled to the housing by engaging the hook, which is formed integrally with the cover body, with the cover rail. Since screwing work is not required when assembling the terminal cover to the housing, assembling work or repairing work can be performed easily.

In some aspects of the present teachings, the cover rail may include a first cover rail and a second cover rail. The hook may include a first hook engaged with the first cover rail so as to slide in the sliding direction and a second hook engaged with the second cover rail so as to slide in the sliding direction.

According to the above electrical device, each of the first hook and the second hook engages so as to slide with the corresponding one of the first cover rail and the second cover rail, the terminal cover can be suppressed from shaking when sliding the terminal cover relative to the housing. The terminal cover can be smoothly slid relative to the housing.

In some aspects of the present teachings, the battery connection terminal may be disposed between the first cover rail and the second cover rail.

According to the above electrical device, an area occupied by the battery connection terminal, the terminal cover, and the cover rail can be made smaller in the sliding direction.

In some aspects of the present teachings, the housing may further include a cover detachment prevention member configured to prevent the hook from moving and/or deforming in such a way as to cause the hook to be disengaged from the cover rail.

According to the above configuration, the hook can be prevented from inadvertently detaching from the cover rail.

In some aspects of the present teachings, the electrical device may further comprise a tension spring housed inside the housing. The terminal cover may be biased in a direction from the exposure position toward the protection position by elastic restoring force of the tension spring.

In some aspects of the present teachings, an electrical device may comprise: a housing to which a battery pack is attached detachably by sliding the battery pack in a sliding direction; a battery connection terminal configured to be electrically connected to the battery pack attached to the housing; a terminal cover configured to move between a protection position for protecting the battery connection terminal and an exposure position for exposing the battery connection terminal; and a tension spring housed inside the housing. The terminal cover may be biased in a direction from the exposure position toward the protection position by elastic restoring force of the tension spring.

In a configuration where the terminal cover is biased in the direction from the exposure position toward the protection position by the elastic restoring force of a compression spring, there is a risk that the compression spring may contact surrounding part(s), which may cause noise or damage the compression spring or the surrounding part(s) when buckling distortion of the compression spring occurs. According to the above configuration, since the terminal cover is biased in the direction from the exposure position toward the protection position by the elastic restoring force of the tension spring, the noise generation or damage of part(s) caused by the buckling distortion of the spring can be suppressed.

In some aspects of the present teachings, one end of the tension spring may be held by the terminal cover. Another end of the tension spring may be held by the housing. The housing may further include: a columnar member configured to hold the other end of the tension spring; and a stopper member configured to prevent the other end from moving along an axial direction of the columnar member.

In a configuration where the other end of the tension spring is held by the columnar member, there is a risk that a position where the columnar member holds the other end of the tension spring may be displaced along the axial direction of the columnar member when the tension spring stretches and contracts. According to the above configuration, the position where the columnar member of the housing holds the other end of the tension spring can be prevented from being displaced along the axial direction of the columnar member.

In some aspects of the present teachings, the housing may further include a tension spring housing member disposed so as to surround a periphery of the tension spring inside the housing.

If the other end of the tension spring is detached from its attachment position and the tension spring itself moves within the housing, there is a risk that the tension spring contacts another part(s) such as a circuit board, thereby causing a failure. According to the above configuration, even if the end of the tension spring is detached from the attachment position, the tension spring itself can be prevented from moving within the housing, and the tension spring can be prevented from contacting the other part(s) such as the circuit board.

In some aspects of the present teachings, the cover rail may be formed at an edge of a through hole formed on the housing. The hook may have a shape protruding from the cover body in a direction in which the terminal cover moves from the exposure position to the protection position.

When the cover rail is formed in the edge part of the through hole formed on the housing, there is a risk that water or foreign matter enters from outside of the housing through the through hole, thus a movement of the tension spring may be affected in a state where the battery pack is not installed. According to the above configuration, since the terminal cover has a shape protruding from the cover body in the direction from the exposure position toward the protection position, the hook can cover the tension spring from the outside of the housing even in the state where the battery pack is not installed. In the state where the battery pack is not installed, water or foreign matter can be suppressed from entering from the outside of the housing through the through hole, and the movement of the tension spring can be suppressed from being affected thereby.

In some aspects of the present teachings, a ridge extending along the sliding direction may be provided on an outer surface of the cover rail.

If the hook slides repeatedly relative to the cover rail when the ridge as aforementioned is not provided on the outer surface of the cover rail, there is a risk that scratches may be formed on the outer surface of the cover rail and consequently an aesthetic appearance of the electrical device may be impaired. According to the above configuration, the scratches can be suppressed from being formed on the outer surface of the cover rail even when the hook slides relative to the cover rail repeatedly, and thus the aesthetic appearance of the electrical device can be maintained.

In some aspects of the present teachings, the terminal cover may further include a cover plate formed integrally with the hook and extending along an outer surface of the cover rail. The cover plate may have a longitudinal direction along the sliding direction.

According to the above configuration, the terminal cover can be suppressed from shaking relative to the housing even when force in a rotating direction which moves vertically an end of the terminal cover located along the sliding direction is applied on the terminal cover, and consequently the terminal cover can be suppressed from contacting the battery connection terminal.

In some aspects of the present teachings, the cover body may include a reinforcing member along a plane orthogonal to the sliding direction.

According to the above configuration, rigidity of the cover body in a direction orthogonal to the sliding direction can be improved. Such a configuration allows to suppress the cover body from deforming even when an impact is applied on the cover body, and accordingly suppress the cover body from contacting the battery connection terminal.

First Embodiment

A charger 10 of a first embodiment will be described with reference to FIGS. 1 to 14. As shown in FIG. 1, the charger 10 is an electrical device configured to charge a battery pack 2. The battery pack 2 is a power source for a power tool (not shown) and power working machine (not shown), and configured to be attached detachably to the power tool or power working machine. The battery pack 2 is attached/detached to and from the charger 10 by sliding in a predetermined direction. A direction that projected a sliding direction of the battery pack 2 on a surface on which the charger 10 is placed is termed a front-rear direction, a direction orthogonal to the front-rear direction in the placed surface of the charger 10 is termed a left-right direction, and a direction orthogonal to the placed surface of the charger 10 is termed an up-down direction.

Figure 2:
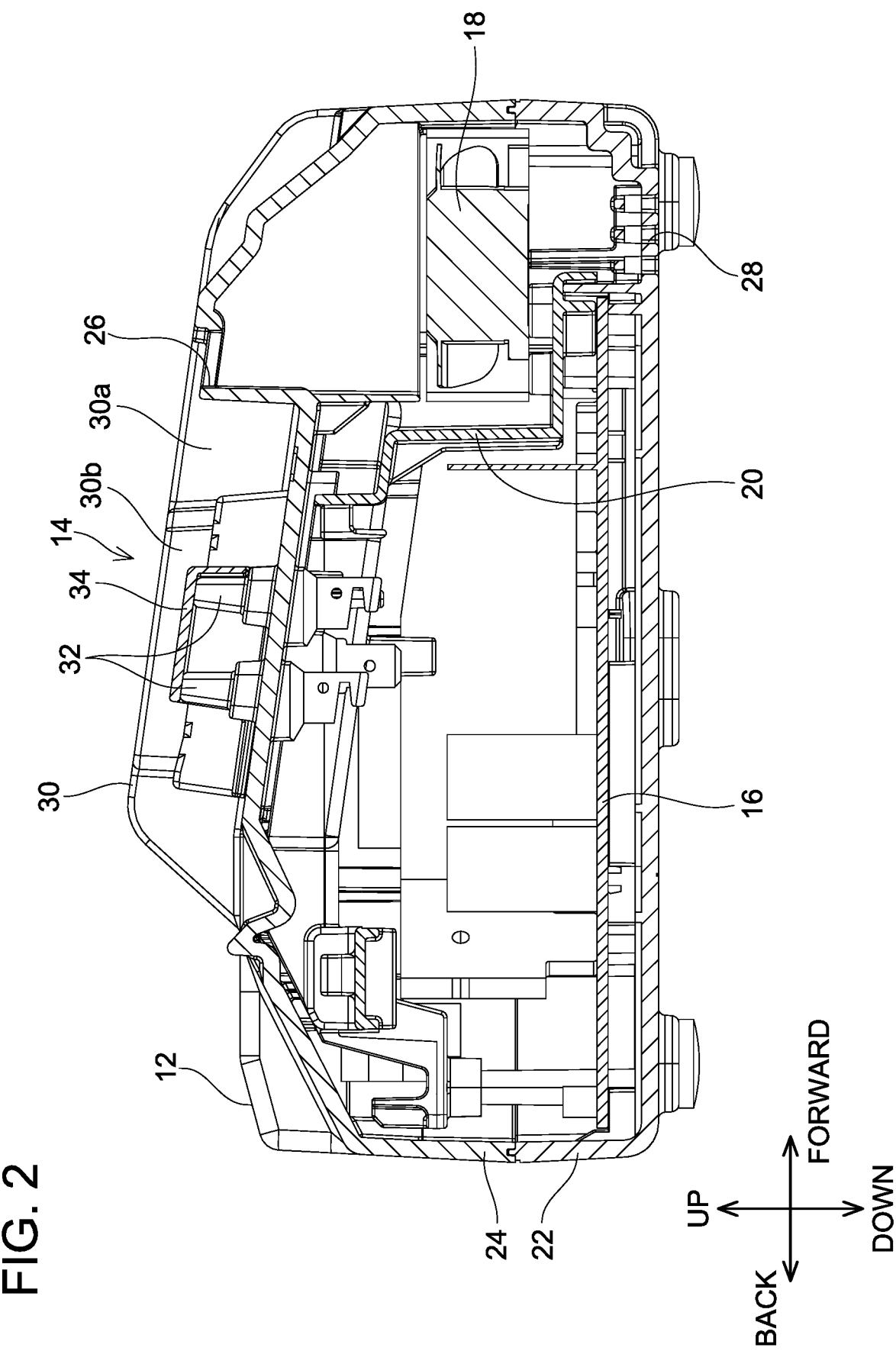
FIG. 2 is a vertical cross-sectional view showing the charger 10 of the first embodiment.
Figure 3:
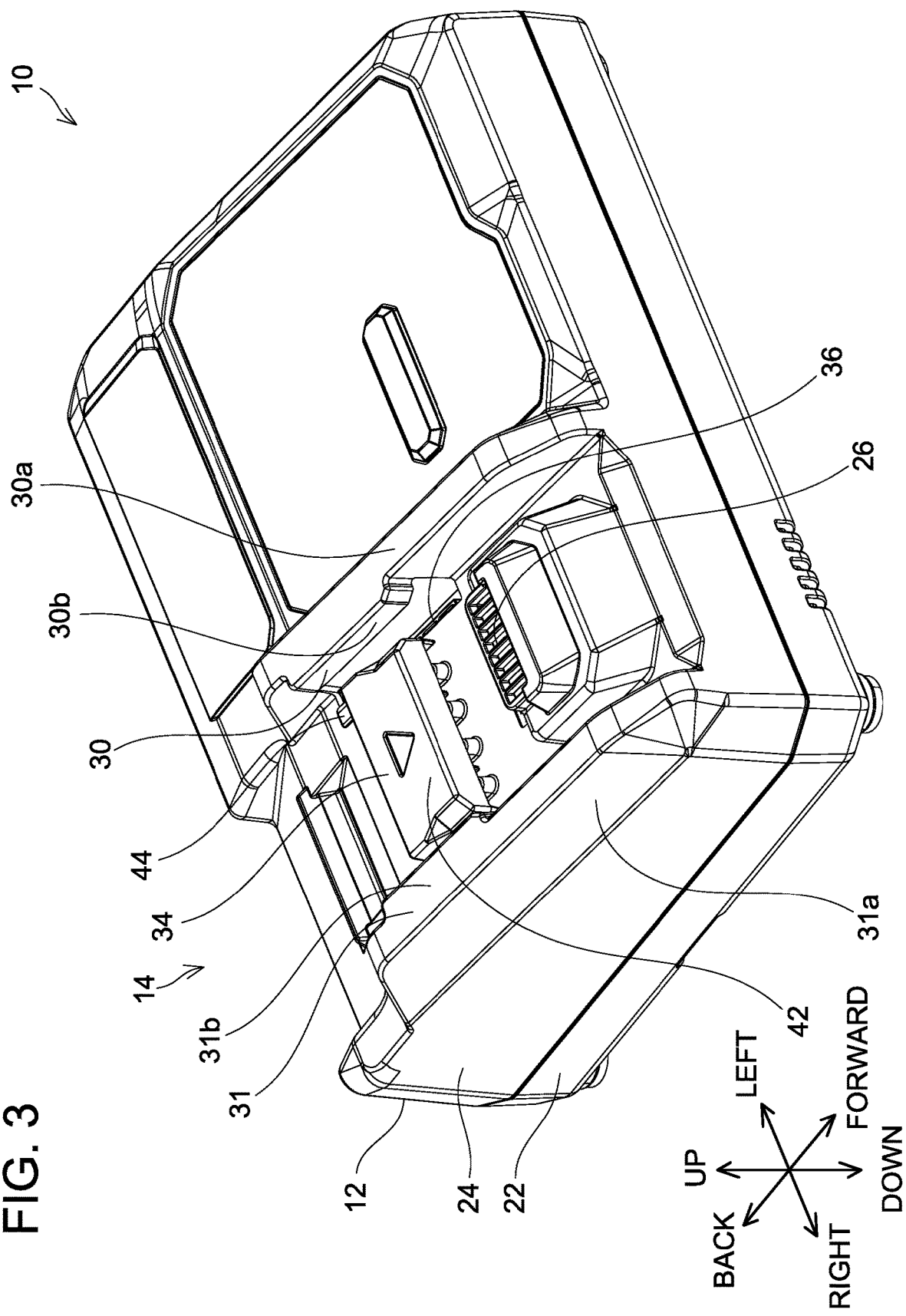
FIG. 3 is a perspective view showing the charger 10 of the first embodiment in which a terminal cover 34 is located in a protection position.

As shown in FIG. 2, the charger 10 comprises a housing 12, a battery pack receptacle 14, a charging circuit 16, and a fan 18. The housing 12 includes an inner frame 20, a lower housing 22, and an upper housing 24. The lower housing 22 defines an outer shape of lower-half surfaces of the charger 10, and the upper housing 24 defines an outer shape of upper-half surfaces of the charger 10. The upper housing 24 is fixed to the lower housing 22 by a fastener (not shown). The charging circuit 16, the fan 18, and the inner frame 20 are housed inside the lower housing 22 and the upper housing 24, and are fixed to the lower housing 22 respectively by fasteners (not shown).

The battery pack receptacle 14 is arranged on an upper surface of the upper housing 24. In the present embodiment, the charger 10 includes one battery pack receptacle 14, thus one battery pack 2 can be attached to the charger 10. Instead of such a configuration, the charger 10 may include two or more battery receptacles 14, and thus two or more battery packs 2 may be attached to the charger 10. The charging circuit 16 is configured to convert alternating-current power to direct-current power, and supply charging power to the battery pack 2 attached to the battery receptacle 14. The fan 18 is configured to suction air from an intake port 26 arranged on the upper housing 24, and exhaust the air from an exhaust port 28 arranged on the lower housing 22. An exhaust port (not shown) of the battery pack 2 is arranged to face the intake port 26 of the upper housing 24 in a state where the battery pack 2 is attached to the battery pack receptacle 14. When the charger 10 charges the battery pack 2, the charging circuit 16 cools the battery pack 2 by driving the fan 18 to suction the air in from the exhaust port of the battery pack 2 and circulating cooling air inside the battery pack 2.

Figure 6:
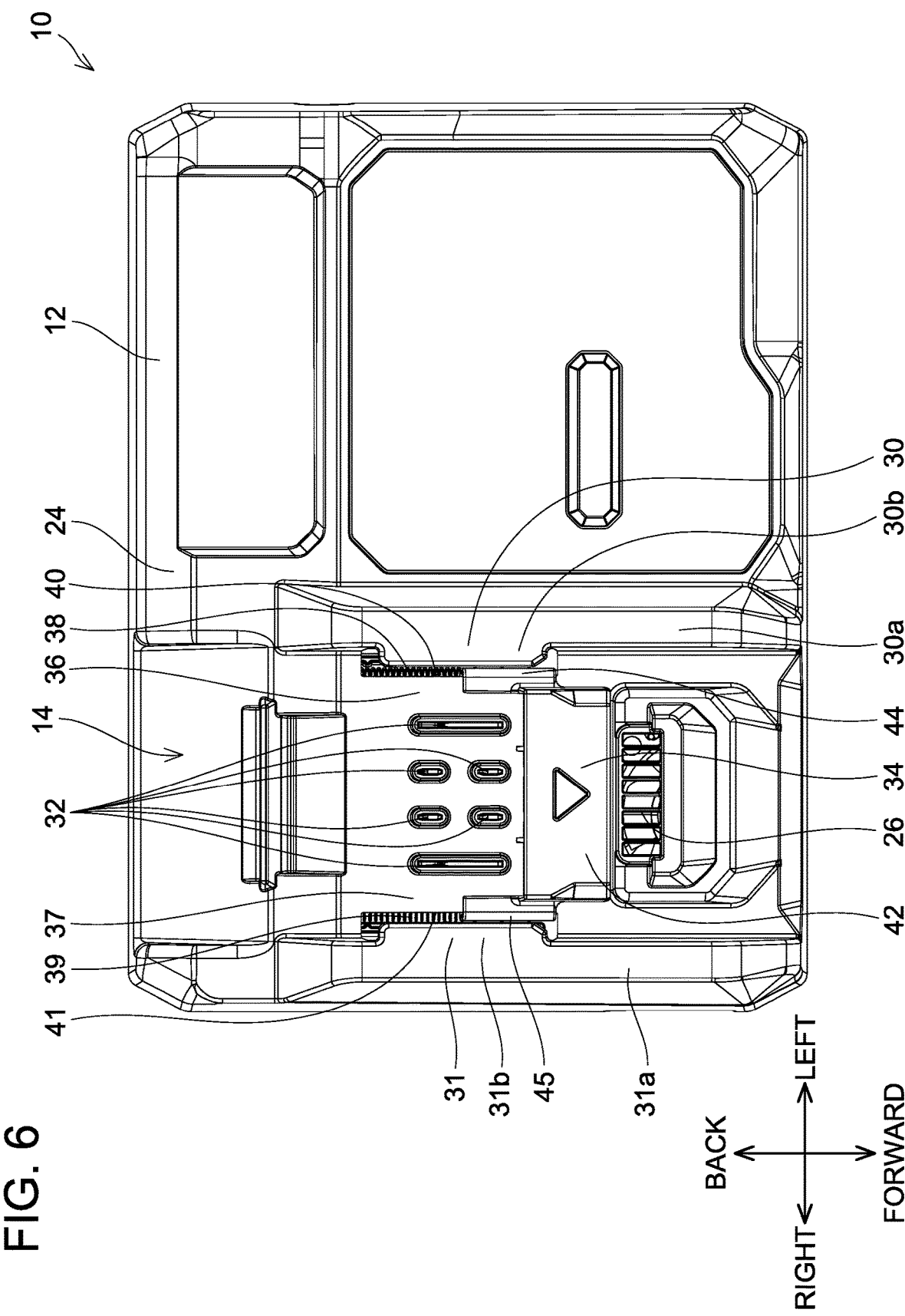
FIG. 6 is a top view showing the charger 10 of the first embodiment in which the terminal cover 34 is located in the exposure position.

As shown in FIGS. 3 to 6, the battery pack receptacle 14 includes battery rails 30, 31, battery connection terminals 32 (see FIGS. 5, 6), a terminal cover 34, cover rails 36, 37, and tension springs 38, 39 (see FIG. 6). The battery rail 30 is arranged on a left end of the battery pack receptacle 14. The battery rail 30 includes a supporting wall 30a protruding upward from the upper housing 24, and a guide rib 30b protruding rightward from an upper end of the supporting wall 30a. The battery rail 31 is arranged on a right end of the battery pack receptacle 14. The battery rail 31 includes a supporting wall 31a protruding upward from the upper housing 24 and a guide rib 31b protruding leftward from an upper end of the supporting wall 31a. When the battery pack 2 is to be attached to the battery pack receptacle 14, the guide ribs 30b, 31b enter into guide grooves (not shown) formed in the battery pack 2 such that the battery pack 2 is held by the battery rails 30, 31 so as to slide in the sliding direction. The battery connection terminals 32 are arranged between the battery rails 30, 31. The battery connection terminals 32 are held by the upper housing 24 such that upper parts of the terminals 32 protrude upward from the upper housing 24. The battery connection terminals 32 are electrically connected to the charging circuit 16 by wiring (not shown) within the housing 12.

The terminal cover 34 is held by the cover rails 36, 37 so as to slide in the sliding direction. The terminal cover 34 is configured to slide between a protection position for protecting the battery connection terminals 32 (see FIGS. 3, 4) and an exposure position for exposing the battery connection terminals 32 (see FIGS. 5, 6). The terminal cover 34 is biased in a direction from the exposure position toward the protection position by elastic restoring force of the tension springs 38, 39. This allows the terminal cover 34 to be retained in the protection position by the elastic restoring force of the tension springs 38, 39 in a state where the battery pack 2 is not attached to the battery pack receptacle 14. When the battery pack 2 is to be attached to the battery pack receptacle 14, the terminal cover 34 moves from the protection position to the exposure position by the terminal cover 34 being pressed by the battery pack 2. The cover rails 36, 37 are formed on the upper surface of the upper housing 24. In the present embodiment, through holes 40, 41 that have a longitudinal direction along the sliding direction are formed on the upper surface of the upper housing 24, and edge parts of the through holes 40, 41 of the upper housing 24 constitute the cover rails 36, 37.

Figure 7:
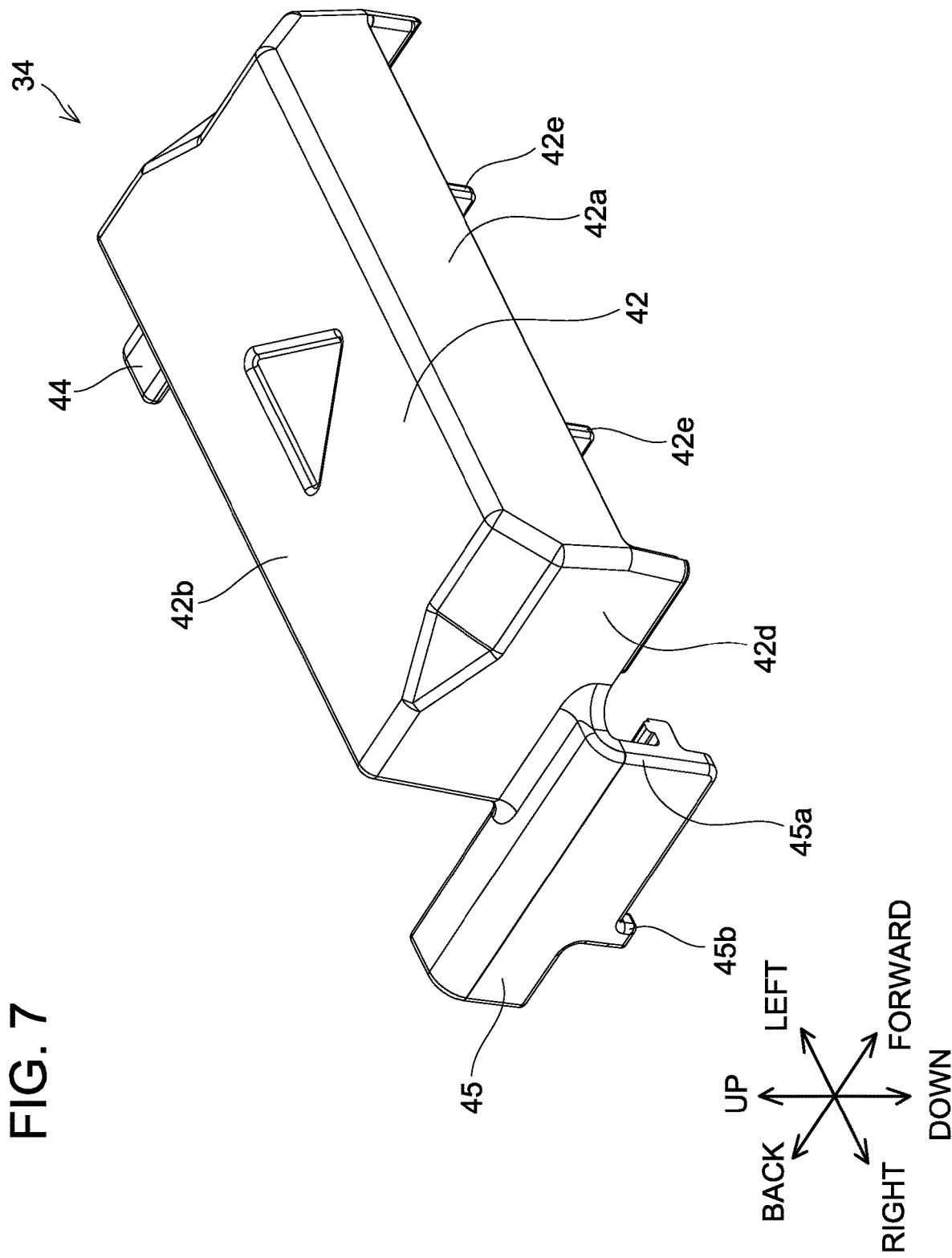
FIG. 7 is a perspective view showing the terminal cover 34 of the charger 10 of the first embodiment from a front-right upper side.
Figure 8:
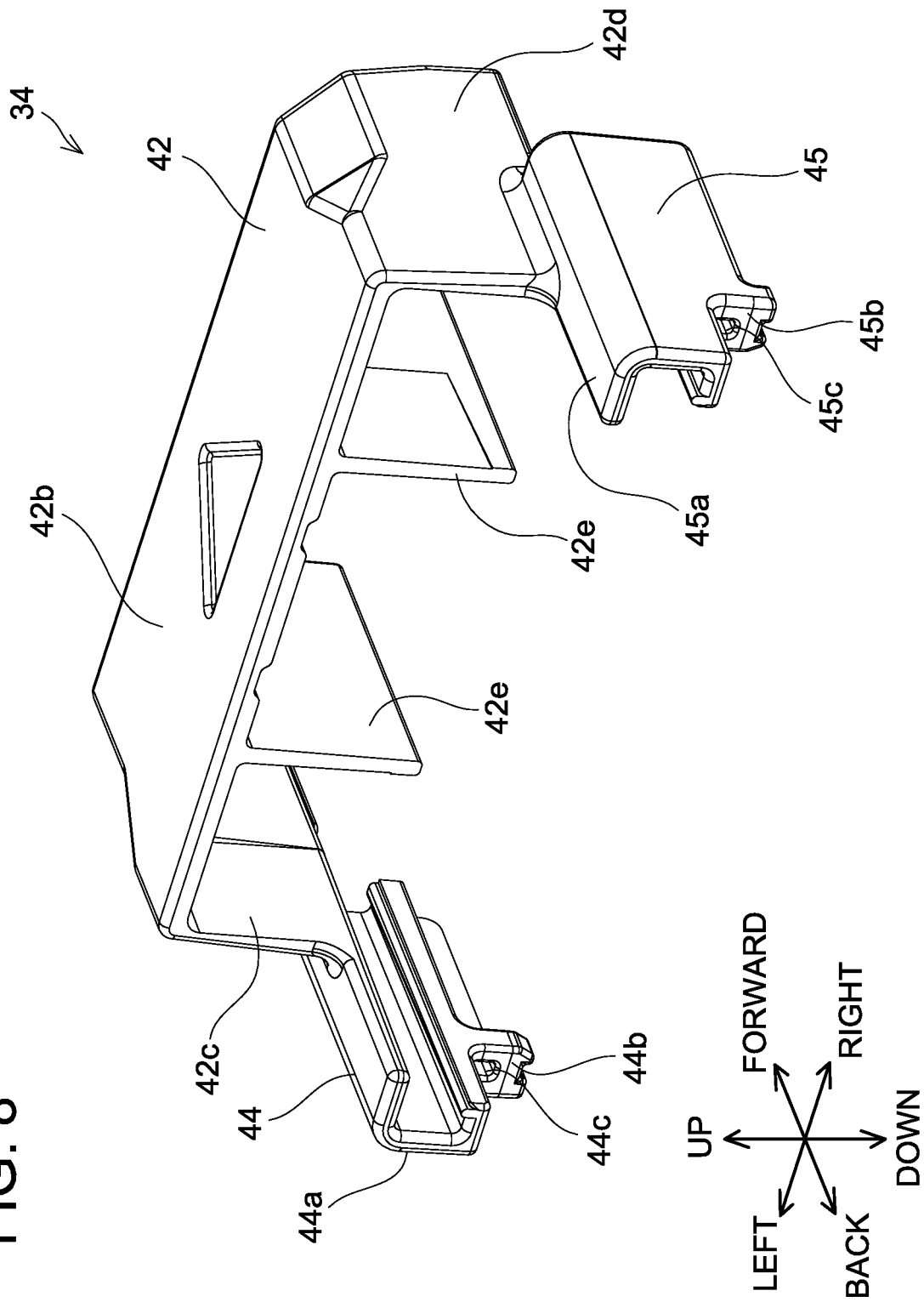
FIG. 8 is a perspective view showing the terminal cover 34 of the charger 10 of the first embodiment from a rear-right upper side.

As shown in FIGS. 7, 8, the terminal cover 34 includes a cover body 42 and hooks 44, 45. The cover body 42 and the hooks 44, 45 are formed integrally. The cover body 42 includes a front plate 42a covering a front side of the battery connection terminals 32, an upper plate 42b covering an upper part thereof, a left plate 42c covering a left side thereof, a right plate 42d covering a right side thereof, and partition plates 42e arranged between adjacent battery connection terminals 32. The left plate 42c, right plate 42d, and partition plates 42e of the cover body 42 are arranged along a plane parallel to the sliding direction. The hook 44 is formed integrally with the left plate 42c of the cover body 42. The hook 44 includes an engaging portion 44a and a spring receptacle 44b. The engaging portion 44a has a U-shaped cross section which opens rightward, and extends along the sliding direction. The spring receptacle 44b protrudes downward from a lower surface of the engaging portion 44a. A spring receiving hole 44c is formed in the spring receptacle 44b. The hook 45 is formed integrally with the right plate 42d of the cover body 42. The hook 45 includes an engaging portion 45a and a spring receptacle 45b. The engaging portion 45a has a U-shaped cross section which opens leftward, and extends along the sliding direction. The spring receptacle 45b protrudes downward from a lower surface of the engaging portion 45a. A spring receiving hole 45c is formed in the spring receptacle 45b.

Figure 9:
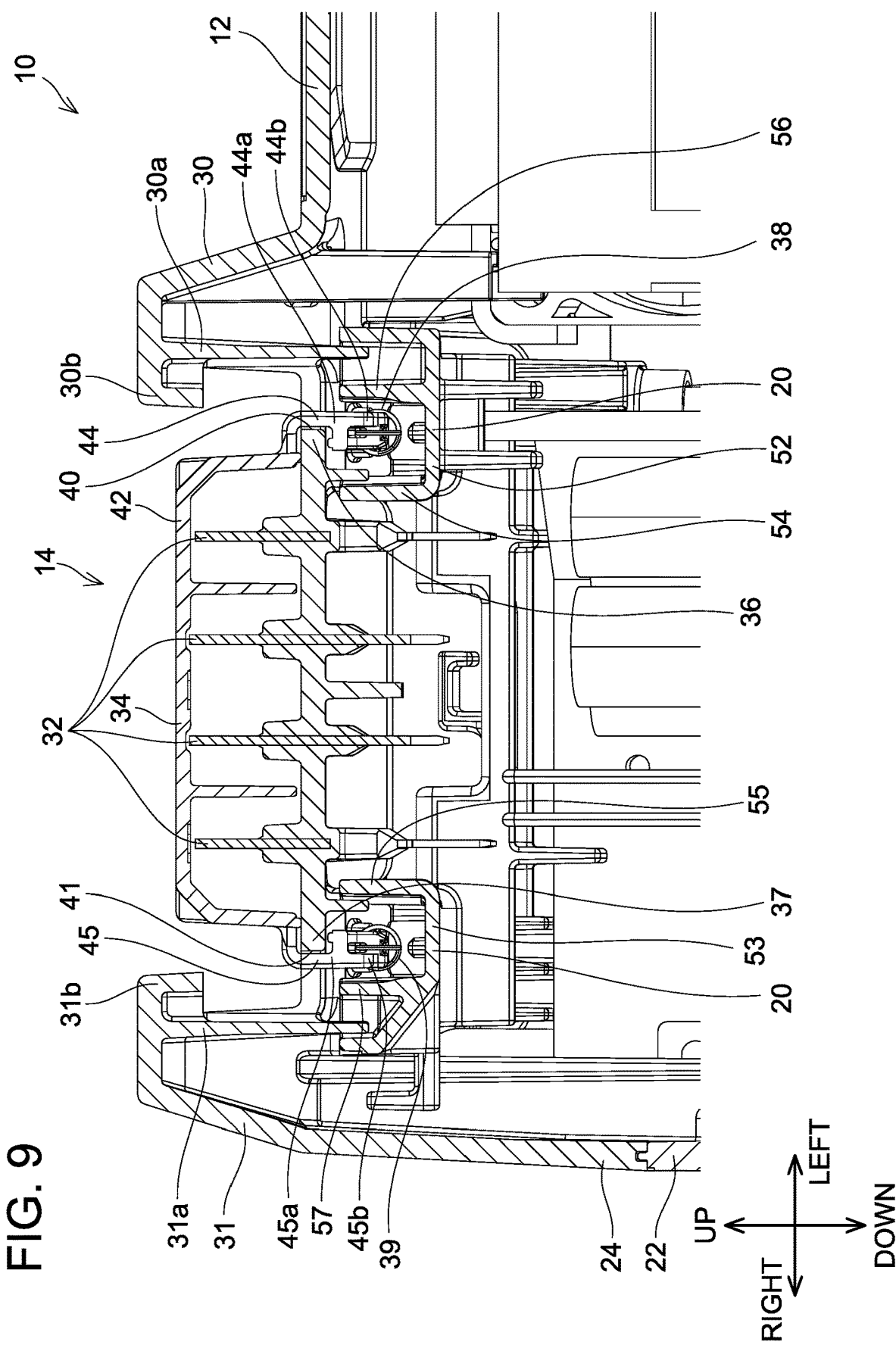
FIG. 9 is a lateral cross-sectional view showing a battery receptacle 14 of the charger 10 of the first embodiment.

As shown in FIG. 9, the terminal cover 34 is attached to the upper housing 24 by the engaging portions 44a, 45a of the hooks 44, 45 being elastically deformed in a direction of opening the portions 44a, 45a outwardly, and the engaging portions 44a, 45a being inserted respectively into the through holes 40, 41. In a state of the terminal cover 34 being attached to the upper housing 24, the engaging portions 44a, 45a of the hooks 44, 45 engage with the cover rails 36, 37 so as to slide in the sliding direction. Due to this, the terminal cover 34 is held onto the upper housing 24 so as to slide in the sliding direction.

Figure 10:
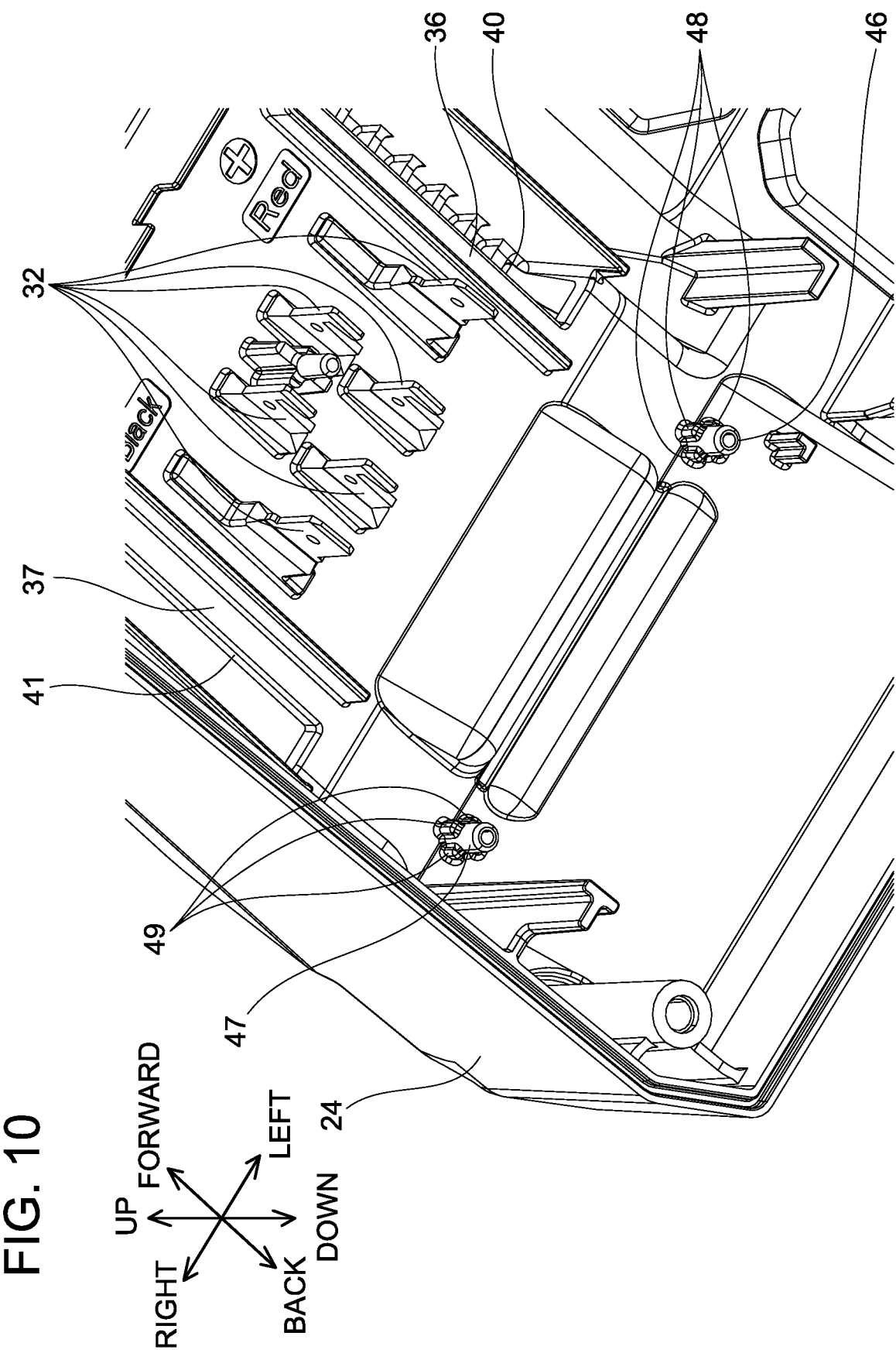
FIG. 10 is a perspective view showing an upper housing 24 of the charger 10 of the first embodiment from a front-right lower side.
Figure 11:
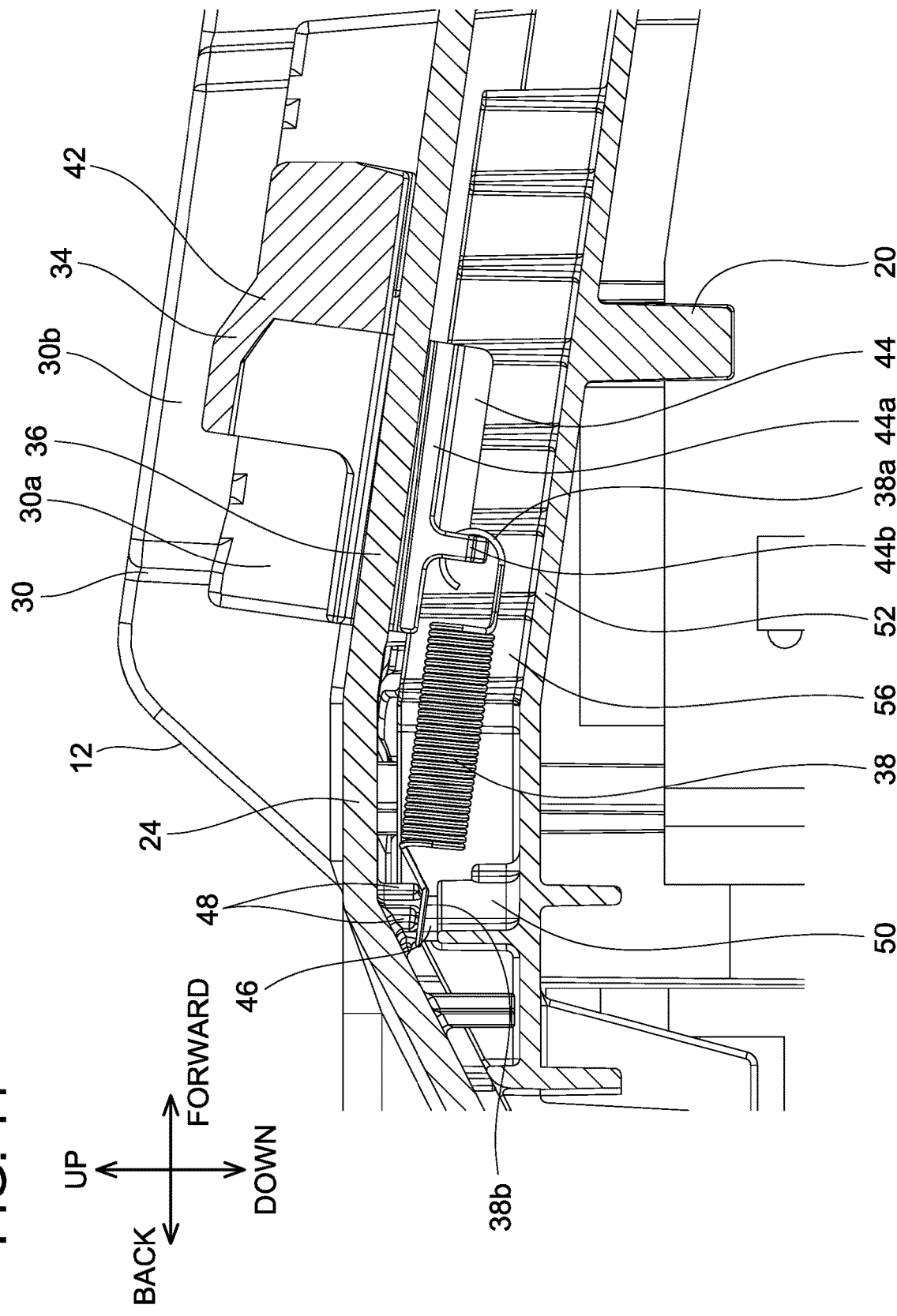
FIG. 11 is a vertical cross-sectional view showing the charger 10 of the first embodiment, and showing a vicinity of a tension spring 38 when the terminal cover 34 is located in the protection position.
Figure 12:
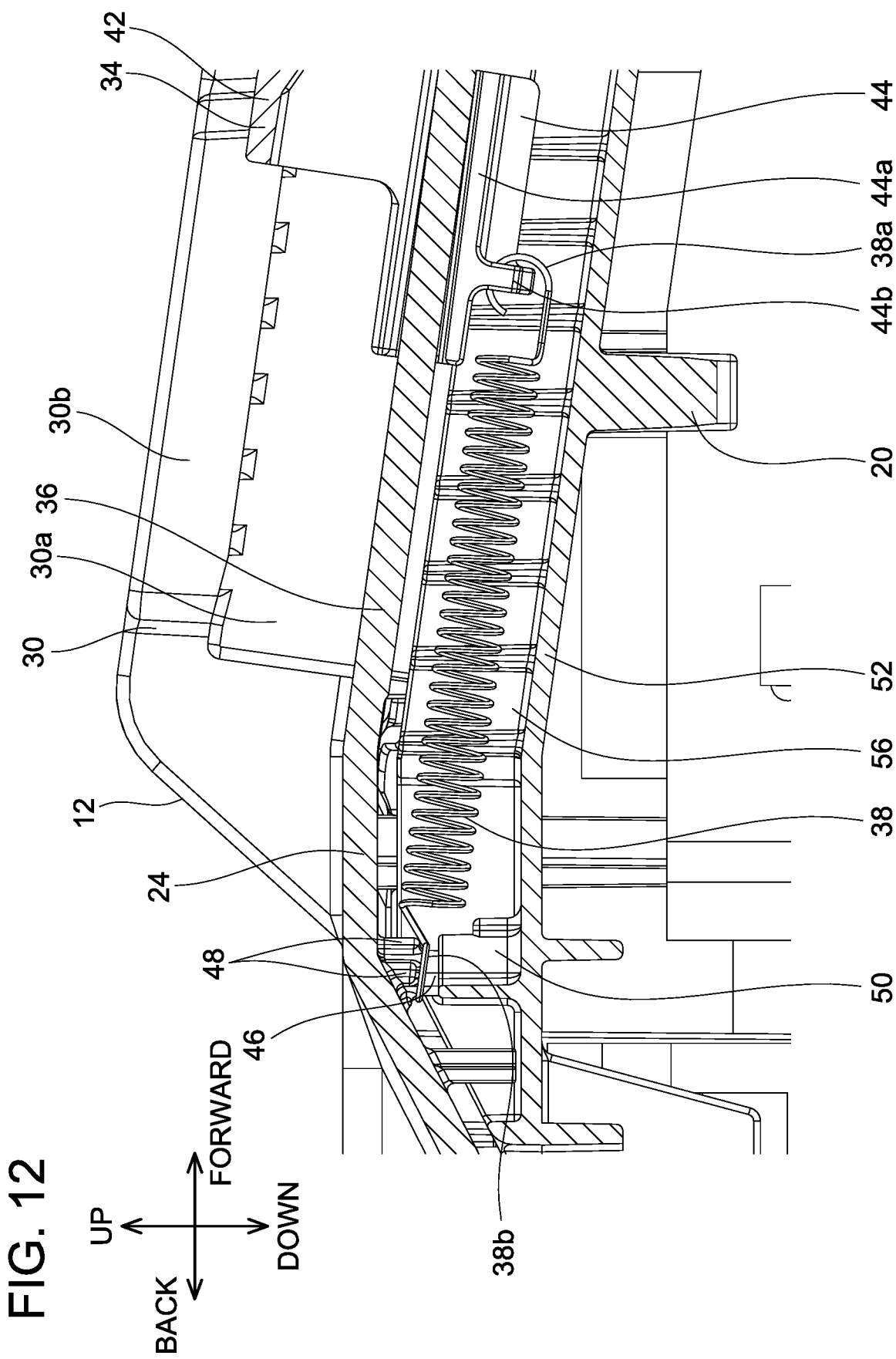
FIG. 12 is a vertical cross-sectional view showing the charger 10 of the first embodiment, and showing the vicinity of the tension spring 38 when the terminal cover 34 is located in the exposure position.

As shown in FIG. 10, spring receiving columns 46, 47 protruding downward are provided on an internal upper surface of the upper housing 24. As shown in FIGS. 11, 12, the tension spring 38 has its front end 38a held by the spring receptacle 44b of the hook 44 of the terminal cover 34, and has its rear end 38b held by the spring receiving column 46 of the upper housing 24. Stopper ribs 48 are provided on an external side surface of the spring receiving column 46. Further, a stopper wall 50 is provided on the inner frame 20 corresponding to the battery receiving column 46. The rear end 38b of the tension spring 38 is restricted from moving along an axial direction of the battery receiving column 46 by the stopper wall 50 and the stopper ribs 48. Similarly, the tension spring 39 has its front end 39a held by the spring receptacle 45b of the hook 45 of the terminal cover 34, and has its rear end 39b held by the spring receiving column 47 of the upper housing 24. Stopper ribs 49 are provided on an external side surface of the spring receiving column 47. Further, a stopper wall 51 is provided on the inner frame 20 corresponding to the battery receiving column 47. The rear end 39b of the tension spring 39 is restricted from moving along an axial direction of the battery receiving column 47 by the stopper wall 51 and the stopper ribs 49.

Figure 13:
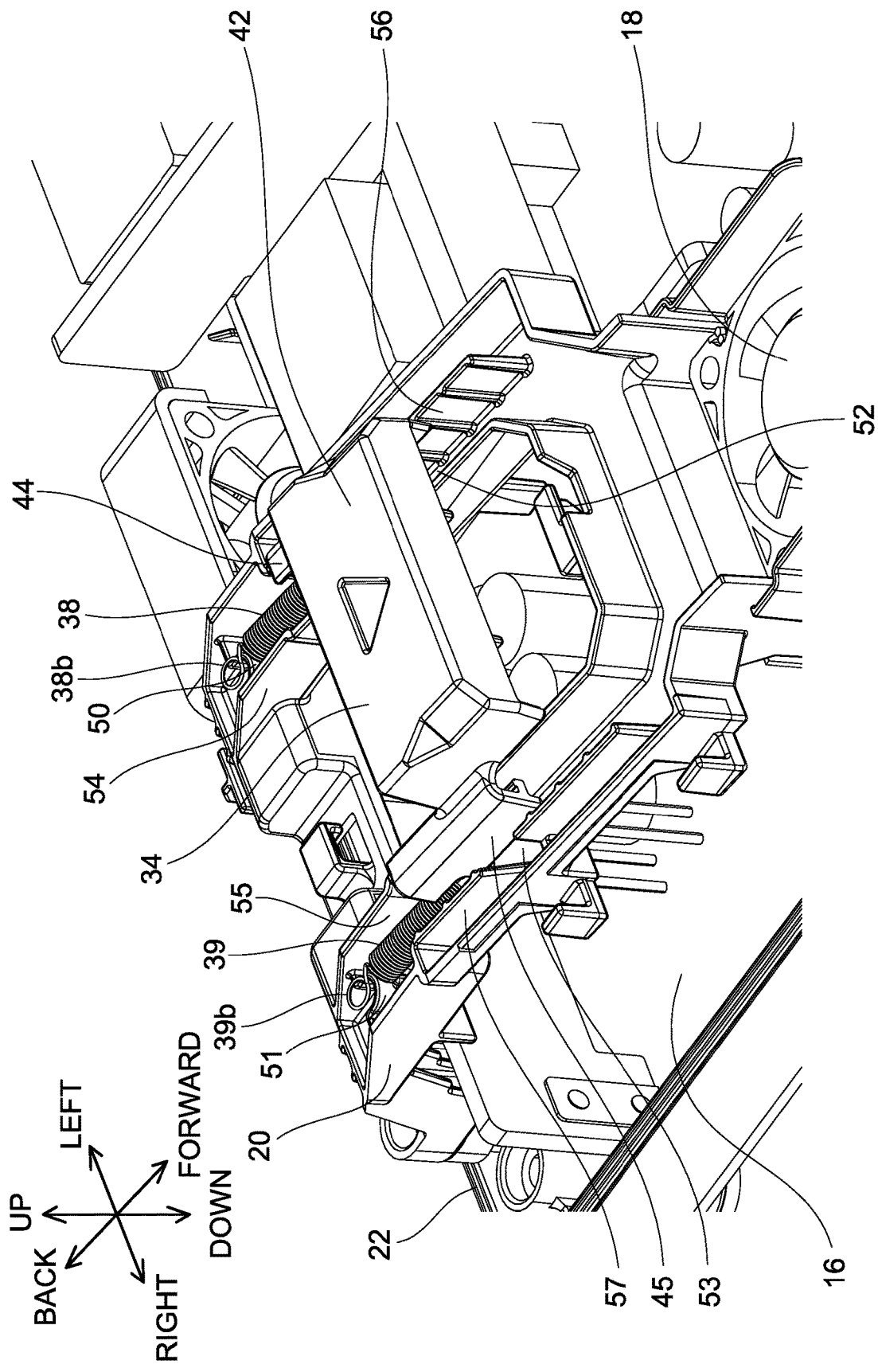
FIG. 13 is a perspective view showing the charger 10 of the first embodiment, and showing an inside of a housing 12 when the terminal cover 34 is located in the protection position.
Figure 14:
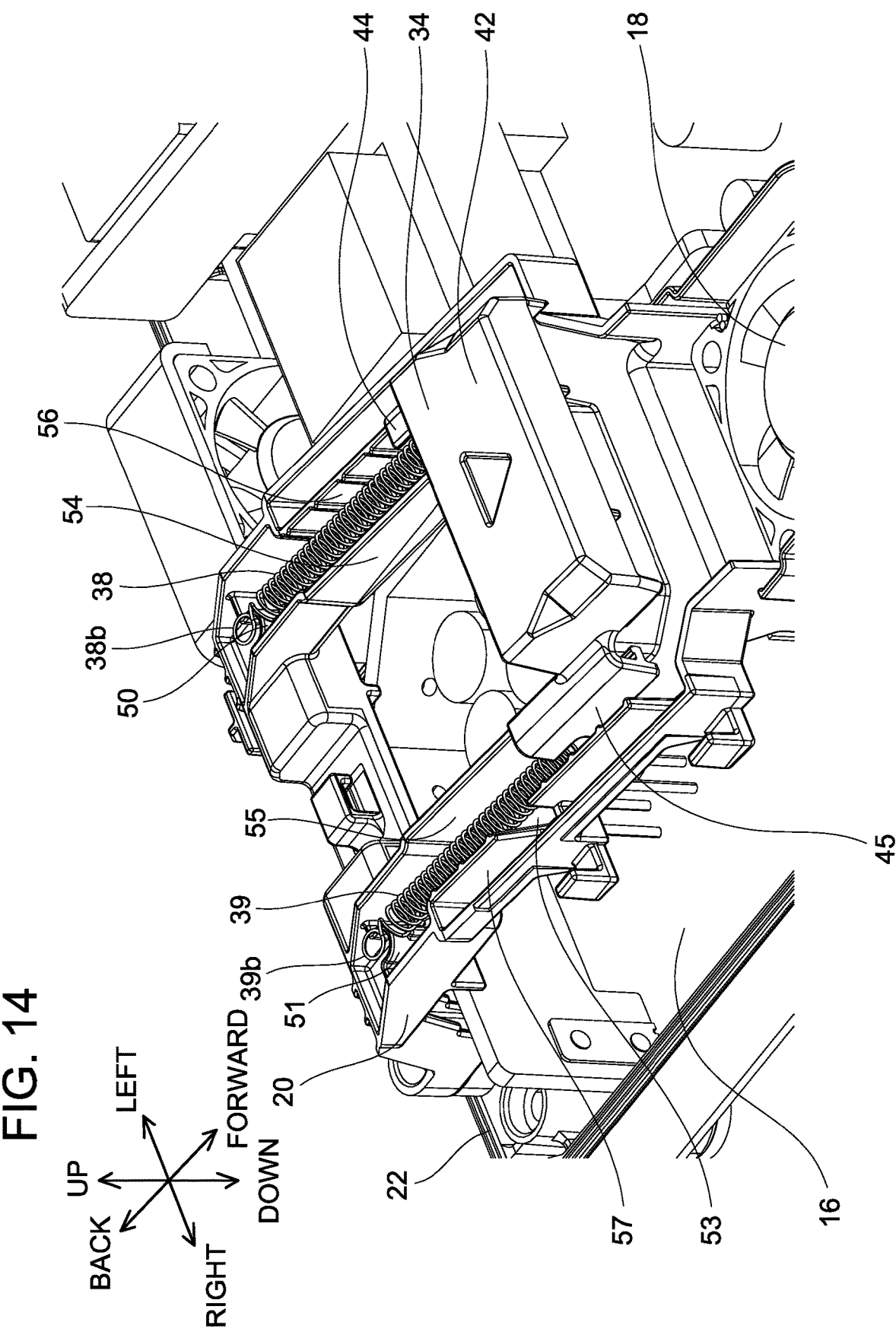
FIG. 14 is a perspective view showing the charger 10 of the first embodiment, and showing the inside of the housing 12 when the terminal cover 34 is located in the exposure position.

As shown in FIGS. 13, 14, the inner frame 20 includes a bottom plate 52 arranged below the tension spring 38, an inner rib 54 protruding upward from the bottom plate 52 on the right side from the tension spring 38, and an outer rib 56 protruding upward from the bottom plate 52 on the left side from the tension spring 38. The tension spring 38 stretches and contracts in a space defined by the bottom plate 52, the inner rib 54 and the outer rib 56 of the inner frame 20, and the upper housing 24. Such a configuration can prevent the tension spring 38 from moving within the housing 12, and accordingly prevent the tension spring 38 from contacting the charging circuit 16 or the fan 18 even when the front end 38a of the tension spring 38 detaches from the hook 44 and/or the rear end 38b of the tension spring 38 detaches from the battery receiving column 46. Similarly, the inner frame 20 includes a bottom plate 53 arranged below the tension spring 39, an inner rib 55 protruding upward from the bottom plate 53 on the left side from the tension spring 39, and an outer rib 57 protruding upward from the bottom plate 53 on the right side from the tension spring 39. The tension spring 39 stretches and contracts in a space defined by the bottom plate 53, the inner rib 55 and the outer rib 57 of the inner frame 20, and the upper housing 24. Such a configuration can prevent the tension spring 39 from moving within the housing 12, and accordingly prevent the tension spring 39 from contacting the charging circuit 16 or the fan 18 even when the front end 39a of the tension spring 39 detaches from the hook 45 and/or the rear end 39b of the tension spring 39 detaches from the battery receiving column 47.

As shown in FIG. 9, the outer rib 56 of the inner frame 20 is arranged on the left side from the hook 44 of the terminal cover 34. Due to this, the hook 44 can be prevented from moving and deforming in a direction detaching from the cover rail 36. Further, the outer rib 57 of the inner frame 20 is arranged on the right side from the hook 45 of the terminal cover 34. Due to this, the hook 45 can be prevented from moving or deforming in a direction detaching from the cover rail 37. Such a configuration can prevent each of the hooks 44, 45 from detaching inadvertently from the corresponding cover rail 36, 37.

Further, in the above embodiment, a configuration where the upper housing 24 is provided with two cover rails 36, 37 and the terminal cover 34 is provided with two hooks 44, 45 was described. Alternatively, the upper housing 24 may be provided with one cover rail and the terminal cover 34 may be provided with one hook. Further alternatively, the upper housing 24 may be provided with three or more cover rails and the terminal cover 34 may be provided with three or more hooks.

In the above embodiment, a configuration where the through holes 40, 41 having their longitudinal direction along the sliding direction are formed on the upper surface of the upper housing 24, and the edge portions of the through holes 40, 41 of the upper housing 24 constitute the cover rails 36, 37 was described. Alternatively, the cover rails 36, 37 may be constituted without forming the through holes 40, 41 in the upper housing 24 and instead by providing rail-shaped portions having a L-shape on the upper surface of the upper housing 24.

In the above embodiment, a case where the electrical device is the charger 10 was described, however, the electrical device may be a power tool or a power working machine having the battery pack 2 as its power source, a battery diagnosis device configured to diagnose the battery pack 2, a conversion adapter configured to connect with a device having an interface different from that of the battery pack 2, or another type of electrical device to which the battery pack 2 is detachably attached.

As aforementioned, in one or more aspects of the present teachings, the charger 10 (example of an electrical device) comprises: a housing 12 to which the battery pack 2 is attached detachably by sliding the battery pack 2 in the sliding direction; the battery connection terminals 32 configured to be electrically connected to the battery pack 2 attached to the housing 12; and the terminal cover 34 configured to move between a protection position for protecting the battery connection terminals 32 and an exposure position for exposing the battery connection terminals 32. The housing 12 includes the cover rails 36, 37 extending along the sliding direction. The terminal cover 34 includes: the cover body 42 having a shape that at least partially covers the battery connection terminals 32; and the hooks 44, 45 formed integrally with the cover body 42. The hooks 44, 45 are engaged with the cover rails 36, 37 so as to slide in the sliding direction.

According to the above charger 10, the terminal cover 34 can be assembled to the housing 12 by engaging the hooks 44, 45, which are formed integrally with the cover body 42, with the cover rails 36, 37. Since screwing work is not required when assembling the terminal cover 34 to the housing 12, assembling work or repairing work can be performed easily.

In one or more aspects of the present teachings, the cover rails 36, 37 include a first cover rail 36 and a second cover rail 37. The hooks 44, 45 include a first hook 44 engaged with the first cover rail 36 so as to slide in the sliding direction and a second hook 45 engaged with the second cover rail 37 so as to slide in the sliding direction.

According to the above feature, each of the first hook 44 and the second hook 45 engages so as to slide with the corresponding one of the first cover rail 36 and the second cover rail 37, the terminal cover 34 can be suppressed from shaking when sliding the terminal cover 34 relative to the housing 12. The terminal cover 34 can be smoothly slid relative to the housing 12.

In one or more aspects of the present teachings, the battery connection terminals 32 are disposed between the first cover rail 36 and the second cover rail 37.

According to the above feature, in the charger 10, an area occupied by the battery connection terminals 32, the terminal cover 34, and the cover rails 36, 37 can be made smaller in the sliding direction.

In one or more aspects of the present teachings, the housing 12 further includes the outer rib 56 (example of a cover detachment prevention member) configured to prevent the hooks 44, 45 from moving and/or deforming in such a way as to cause the hooks 44, 45 to be disengaged from the cover rails 36, 37.

According to the above configuration, the hooks 44, 45 can be prevented from inadvertently detaching from the cover rails 36, 37.

In one or more aspects of the present teachings, the charger 10 further comprises the tension springs 38, 39 housed inside the housing 12. The terminal cover 34 may be biased in a direction from the exposure position toward the protection position by elastic restoring force of the tension springs 38, 39.

In a configuration where the terminal cover 34 is biased in the direction from the exposure position toward the protection position by the elastic restoring force of compression spring(s), there is a risk that one or more of the compression spring(s) may contact surrounding part(s), which may cause noise or damage the compression spring(s) or the surrounding part(s) when buckling distortion of the compression spring(s) occurs. According to the above configuration, since the terminal cover 34 is biased in the direction from the exposure position toward the protection position by the elastic restoring force of the tension springs 38, 39, the noise generation or damage of part(s) caused by the buckling distortion of the spring(s) can be suppressed.

In one or more aspects of the present teachings, the front ends 38a, 39a (example of a one end) of the tension springs 38, 39 are held by the terminal cover 34. The rear ends 38b, 39b (example of another end) of the tension springs 38, 39 are held by the housing 12. The housing 12 further includes: the spring receiving columns 46, 47 (example of a columnar member) configured to hold the rear ends 38b, 39b of the tension springs 38, 39; and the stopper ribs 48, 49 and stopper walls 50, 51 (examples of a stopper member) configured to prevent the rear ends 38b, 39b of the tension springs 38, 39 from moving along the axial directions of the spring receiving columns 46, 47.

In a configuration where the rear ends 38b, 39b of the tension springs 38. 39 are held by the spring receiving columns 46, 47, there is a risk that a position where the spring receiving columns 46, 47 hold the back ends 38b, 39b of the tension springs 38, 39 may be displaced along the axial directions of the spring receiving columns 46, 47 when the tension springs 38, 39 stretch and contract. According to the above configuration, the position where the spring receiving columns 46, 47 hold the back ends 38b, 39b of the tension springs 38, 39 can be prevented from being displaced along the axial directions of the spring receiving columns 46, 47.

In one or more aspects of the present teachings, the housing 12 further includes the bottom plates 52, 53, the inner ribs 54, 55 and the outer ribs 56, 57 (examples of a tension spring housing member) disposed so as to surround peripheries of the tension springs 38, 39 inside the housing 12.

If one or more of the front ends 38a, 39b and the rear ends 38b, 39b of the tension springs 38, 39 are detached from its attachment position(s) and the tension spring(s) 38, 39 itself move within the housing 12, there is a risk that the tension spring(s) 38, 39 contact another part(s) such as the charging circuit 16 and the fan 18, thereby causing a failure. According to the above configuration, even if one or more of the front ends 38a, 39b and the rear ends 38b, 39b of the tension springs 38, 39 are detached from the attachment position(s), the tension spring(s) 38, 39 itself can be prevented from moving within the housing 12, and the tension spring(s) 38, 39 can be prevented from contacting the other part(s) such as the charging circuit 16 and the fan 18.

In one or more aspects of the present teachings, the cover rails 36, 37 are formed at edge portions of the through holes 40, 41 formed on the housing 12. The hooks 44, 45 have a shape protruding from the cover body 42 in a direction in which the terminal cover 34 moves from the exposure position to the protection position.

Figure 4:
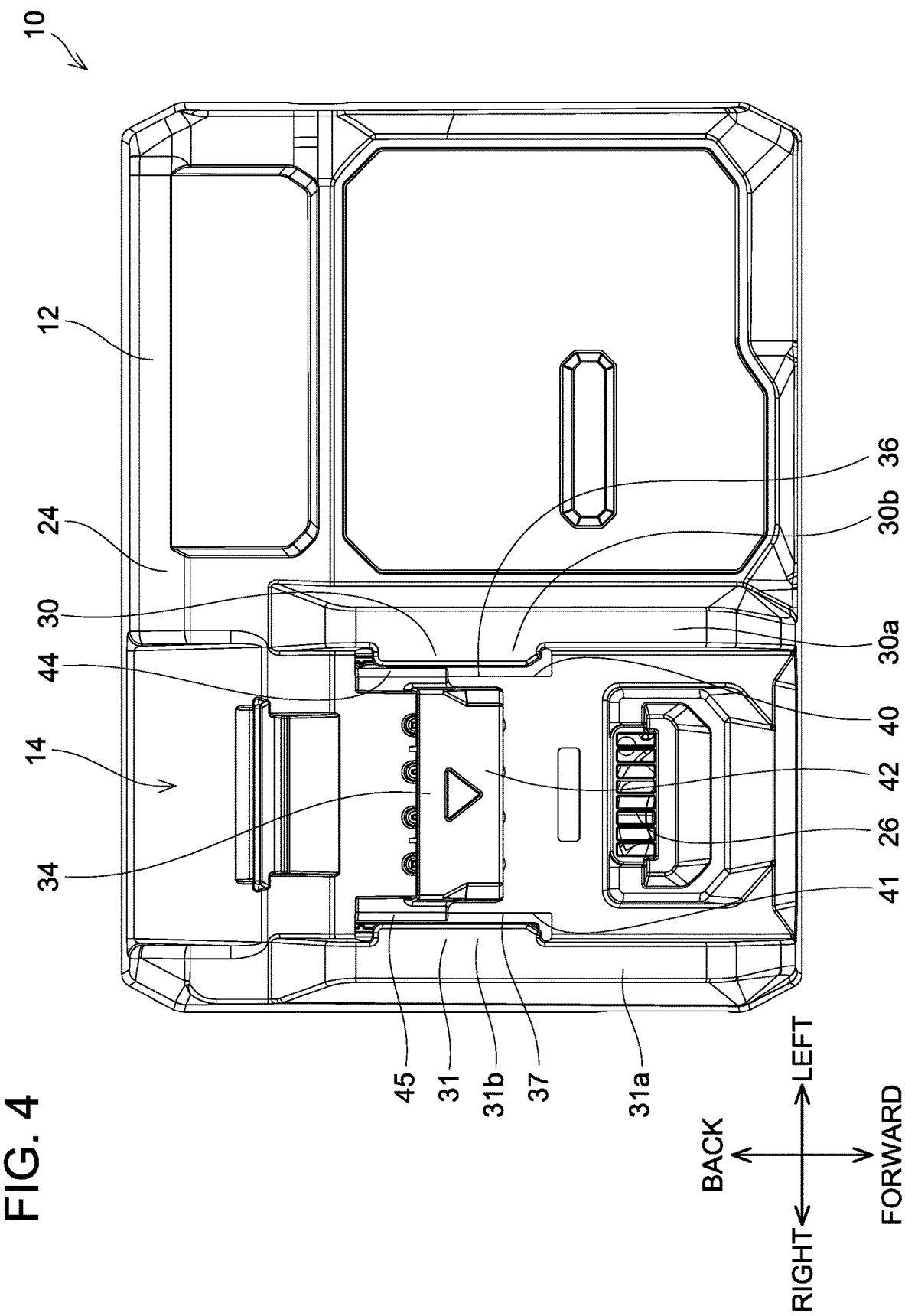
FIG. 4 is a top view showing the charger 10 of the first embodiment in which the terminal cover 34 is located in the protection position.
Figure 5:
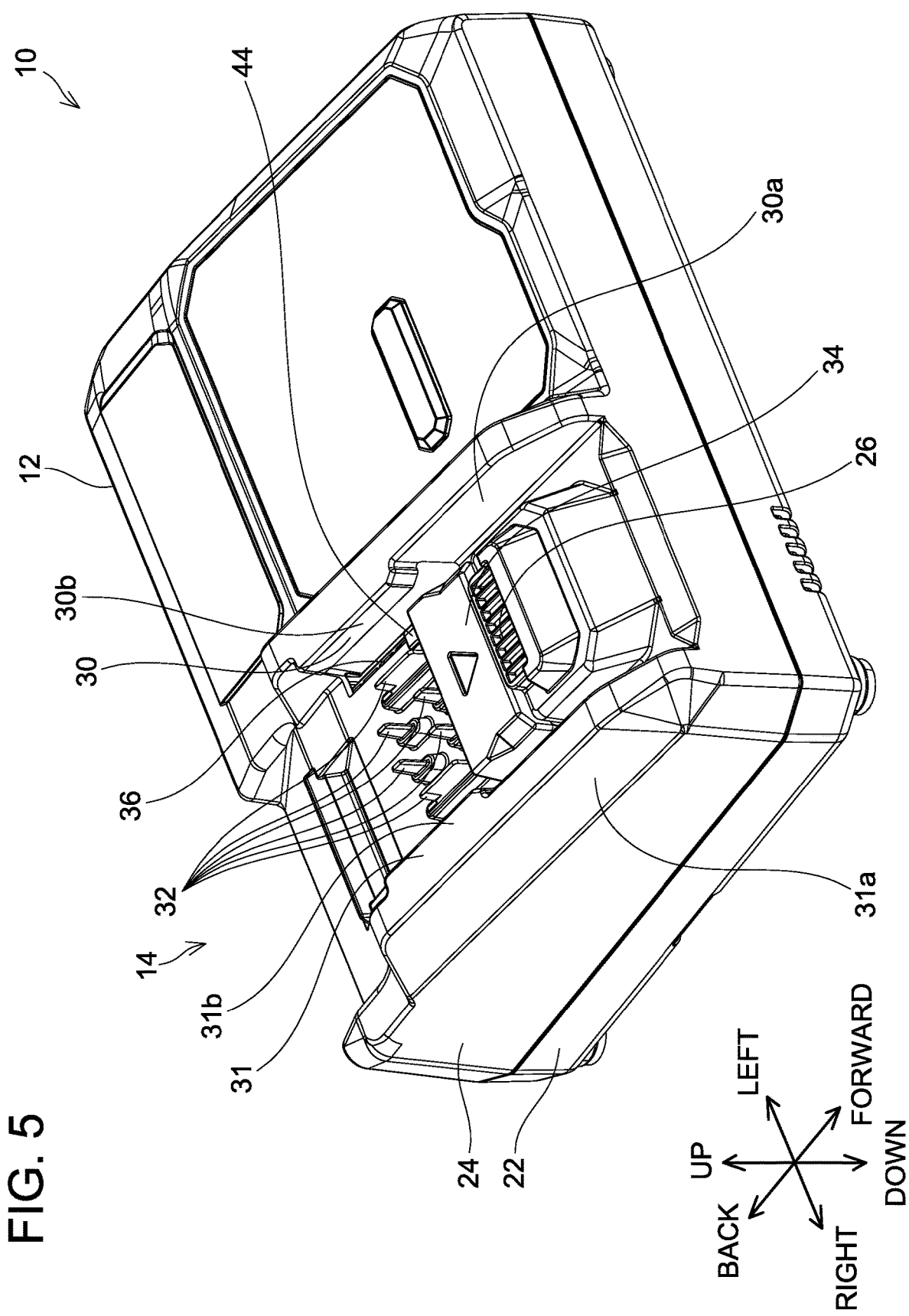
FIG. 5 is a perspective view showing the charger 10 of the first embodiment in which the terminal cover 34 is located in an exposure position.

When the cover rails 36, 37 are formed in the edge portions of the through holes 40, 41 formed on the housing 12, there is a risk that water or foreign matter enters from outside of the housing 12 through the through hole(s) 40, 41, thus a movement of the tension spring(s) 38, 39 may be affected in a state where the battery pack 2 is not installed. According to the above configuration, since the terminal cover 34 has the shape protruding from the cover body 42 in the direction in which the terminal cover 34 moves from the exposure position toward the protection position, the hooks 44, 45 can cover the tension springs 38, 39 from the outside of the housing 12 in the state where the battery pack 2 is not installed, as shown in FIG. 4. Water or foreign matter can be suppressed from entering from outside of the housing 12 through the through hole(s) 40, 41, and the movement of the tension spring(s) 38, 39 can be suppressed from being affected thereby in the state where the battery pack 2 is not installed. If a configuration where the battery pack 2 is used to cover the through holes 40. 41 is adopted, water or foreign matter can be suppressed from entering from the outside of the housing 12 through the through hole(s) 40, 41, and the movement of the tension spring(s) 38, 39 can be suppressed from being affected thereby even in the state where the battery pack 2 is installed.

Second Embodiment

An adapter 102 of a second embodiment will be described with reference to FIGS. 15 to 26. The adapter 102 is an electrical device used for connecting a battery pack 104 and a battery tester 106. The battery pack 104 is used by being attached to a power tool such as a driver and a drill, or to a power working machine such as a grass trimmer and a blower. The battery pack 104 includes lithium ion battery cells, for example. The battery tester 106 is configured to display a remaining charge in the battery pack 104, a total number of times of charging, and a failure position when the battery pack 104 is defected. The adapter 102 is prepared for providing compatibility between a new-type battery pack 104 to an earlier-type battery tester 106, in a situation where the earlier-type battery pack 104 and an earlier-type battery tester 106 are configured connectable with each other and a new-type battery pack 104 and the earlier-type battery tester 106 are configured unconnectable with each other, for example, so as to enable the new-type battery pack 104 and the earlier-type battery tester 106 to be connected. Further, the adapter 102 may be prepared for providing compatibility between an earlier-type battery pack 104 and a new-type battery tester 106 in a situation where the earlier-type battery pack 104 and the new-type battery tester 106 are configured unconnectable with each other, so as to enable the earlier-type battery pack 104 and the new-type battery tester 106 to be connected.

Figure 15:
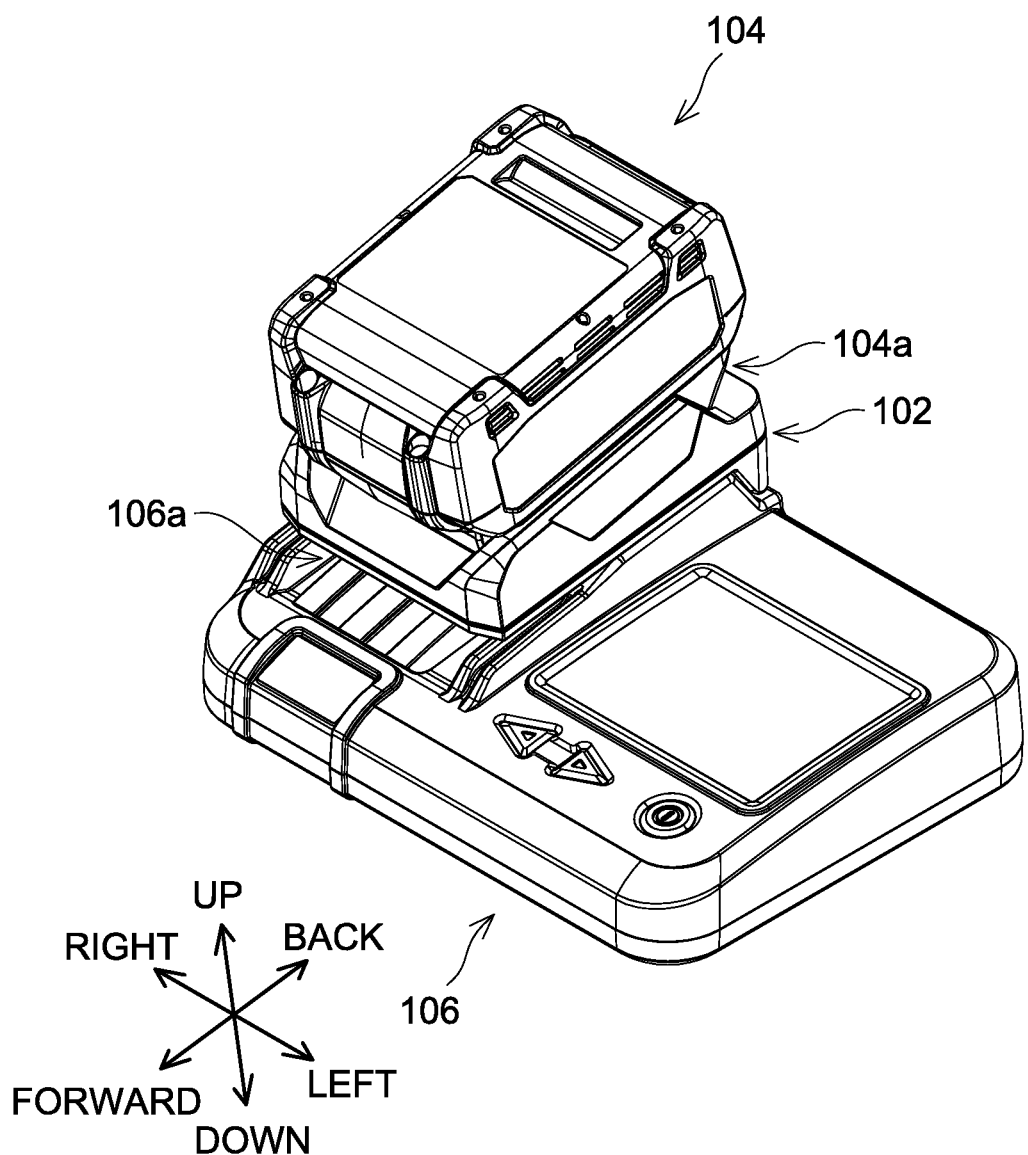
FIG. 15 is a perspective view showing an adapter 102 of a second embodiment together with a battery pack 104 and a battery tester 106.

As shown in FIG. 15, a battery-side attachment 104a is provided on a lower surface of the battery pack 104. A tester-side attachment 106a is provided on an upper surface of the battery tester 106. The tester-side attachment 106a of the battery tester 106 is not compatible with the battery-side attachment 104a of the battery pack 104. Due to this, the battery-side attachment 104a of the battery pack 104 cannot be attached or detached to and from the tester-side attachment 106a of the battery tester 106. A tester receptacle 108 (see FIG. 22) corresponding to the tester-side attachment 106a of the battery tester 106 is provided on a lower surface of the adapter 102, and a battery receptacle 110 (see FIG. 16) corresponding to the battery-side attachment 104a of the battery pack 104 is provided on an upper surface of the adapter 102. The adapter 102 is detachably attached to the battery tester 106 by sliding the tester receptacle 108 of the adapter 102 to the tester-side attachment 106a of the battery tester 106. The battery pack 104 is detachably attached to the adapter 102 by sliding the battery-side attachment 104a of the battery pack 104 to the battery receptacle 110 of the adapter 102. The battery pack 104 is connected with the battery tester 106 via the adapter 102 by attaching the adapter 102 to the battery tester 106 and attaching the battery pack 104 to the adapter 102. Hereinbelow, a direction of sliding the adapter 102 relative to the battery tester 106 is termed a front-rear direction, a direction orthogonal to the front-rear direction is termed a left-right direction, and a direction orthogonal to both the front-rear direction and the left-right direction is termed an up-down direction.

Figure 16:
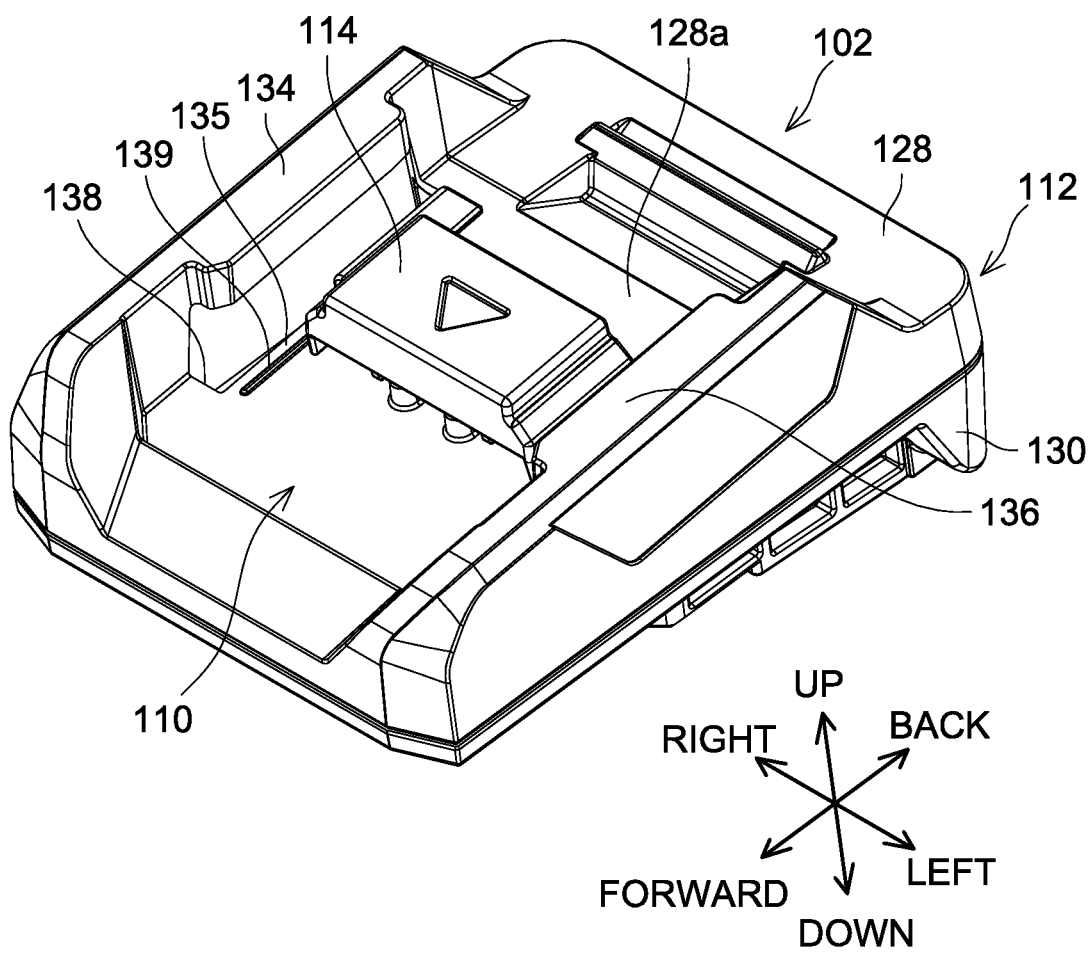
FIG. 16 is a perspective view showing the adapter 102 of the second embodiment when a terminal cover 114 is located in a protection position.
Figure 22:
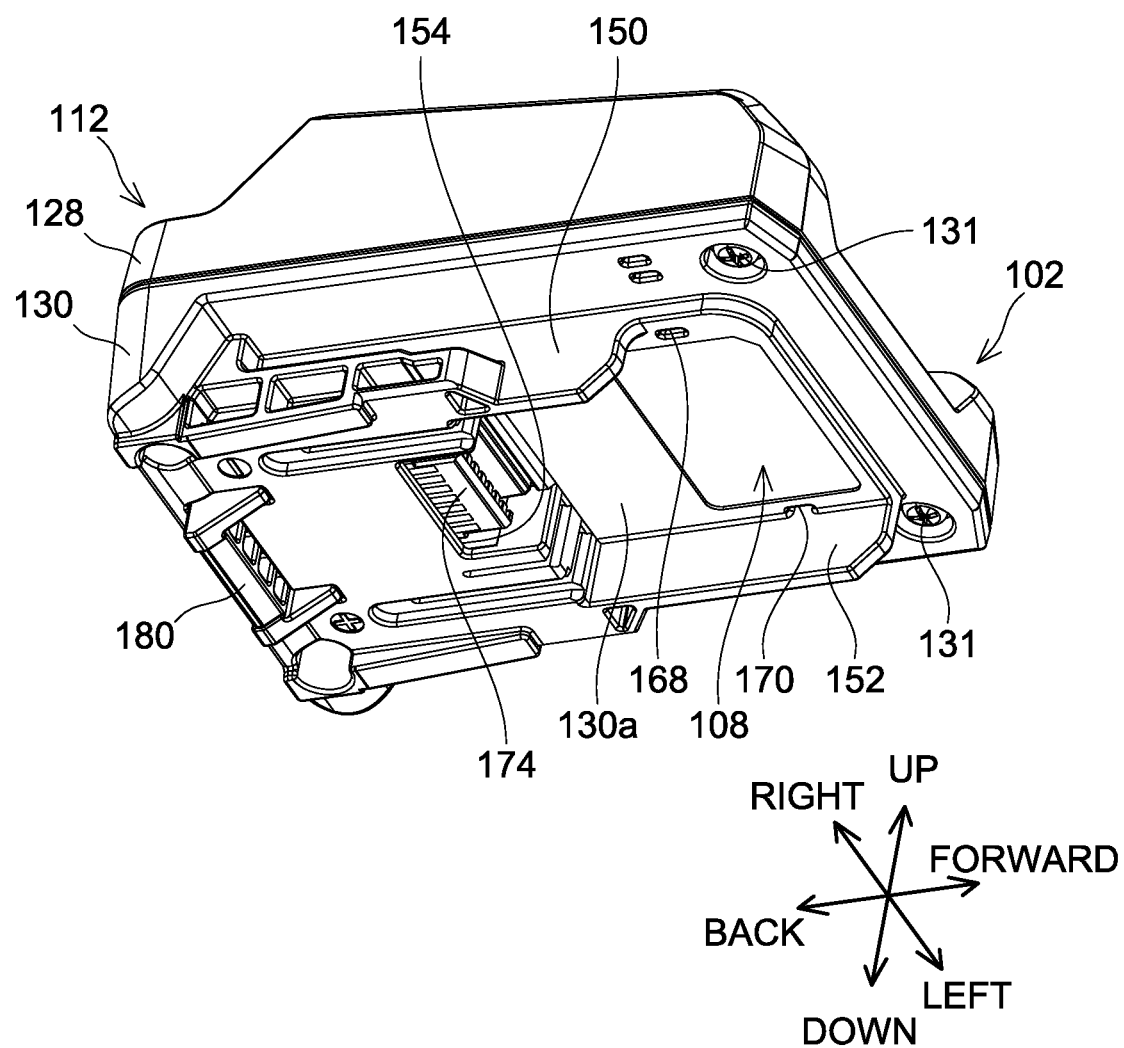
FIG. 22 is a perspective view showing the adapter 102 of the second embodiment from the front-right lower side

As shown in FIG. 16, the adapter 102 includes a housing 112 and a terminal cover 114. The housing 112 includes an upper housing 128 and a lower housing 130. The upper housing 128 defines an upper external shape of the adapter 102. The battery receptacle 110 is provided on an upper surface 128a of the upper housing 128. The lower housing 130 defines a lower external shape of the adapter 102. As shown in FIG. 22, the tester receptacle 108 is provided on a lower surface 130a of the lower housing 130. The upper housing 128 and the lower housing 130 are fixed to each other by screws 131.

Figure 18:
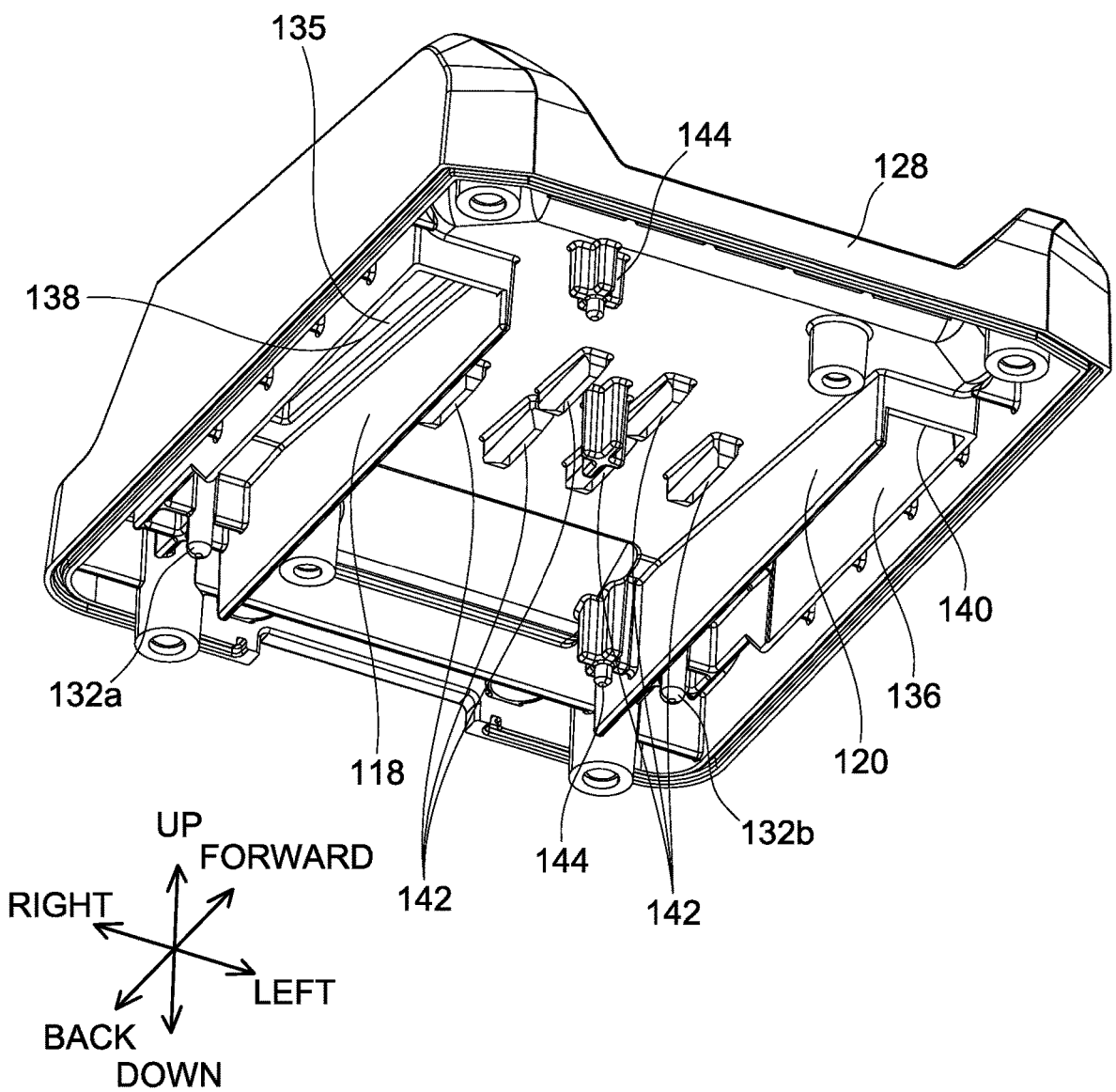
FIG. 18 is a perspective view showing an upper housing 128 of the second embodiment from the front-right lower side.

As shown in FIG. 16, the upper housing 128 is provided with battery rails 134, 136, through holes 138, 140 (see FIGS. 18 to 21 for the through hole 140), and ridges 139, 141 (see FIG. 20), and terminal receptacles 142 (see FIG. 18). The battery rails 134, 136 have their longitudinal direction along a sliding direction of sliding the battery pack 104 relative to the adapter 102. The battery rail 134 is arranged on a right end of the upper surface 128a of the upper housing 128. The battery rail 136 is arranged on a left end of the upper surface 128a of the upper housing 128. When the battery-side attachment 104a of the battery pack 104 is to be attached to the battery receptacle 110 of the adapter 102, the battery rails 134, 136 guide the battery-side attachment 104a in the front-rear direction.

Figure 20:
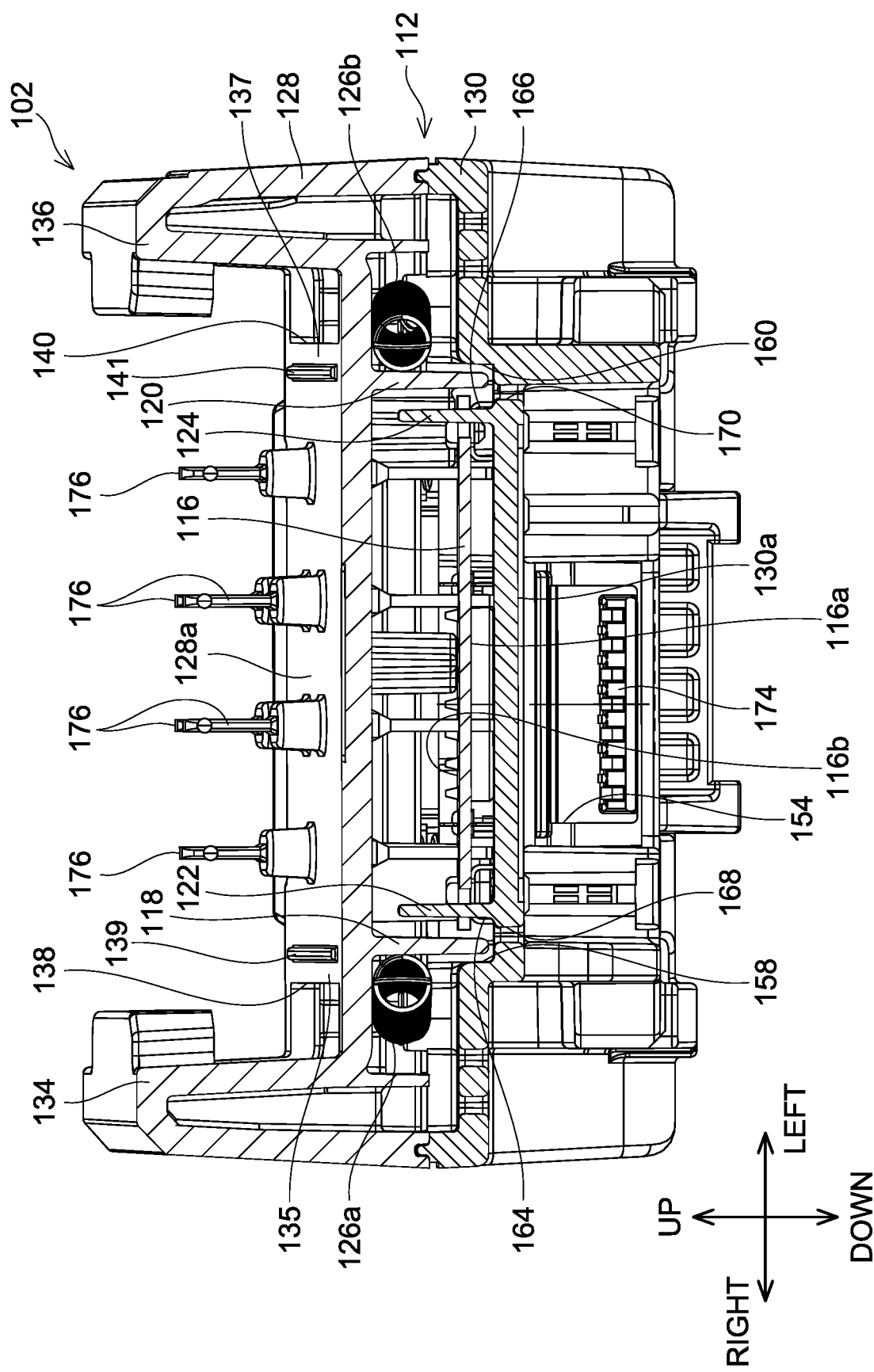
FIG. 20 is a cross-sectional view showing the adapter 102 of the second embodiment with the terminal cover 114 detached therefrom.

The through hole 138 is arranged in vicinity of the battery rail 134. The through hole 138 has its longitudinal direction along the sliding direction. As shown in FIG. 20, the through hole 140 is arranged in vicinity of the battery rail 136. As shown in FIG. 18, the through hole 140 has its longitudinal direction along the sliding direction. The through holes 138, 140 face the battery pack 104 when the battery pack 104 is attached to the adapter 102. The terminal receptacles 142 are arranged between the battery rails 134, 136. In the present embodiment, edge portions of the through holes 138, 140 constitute the cover rails 135, 137.

Figure 17:
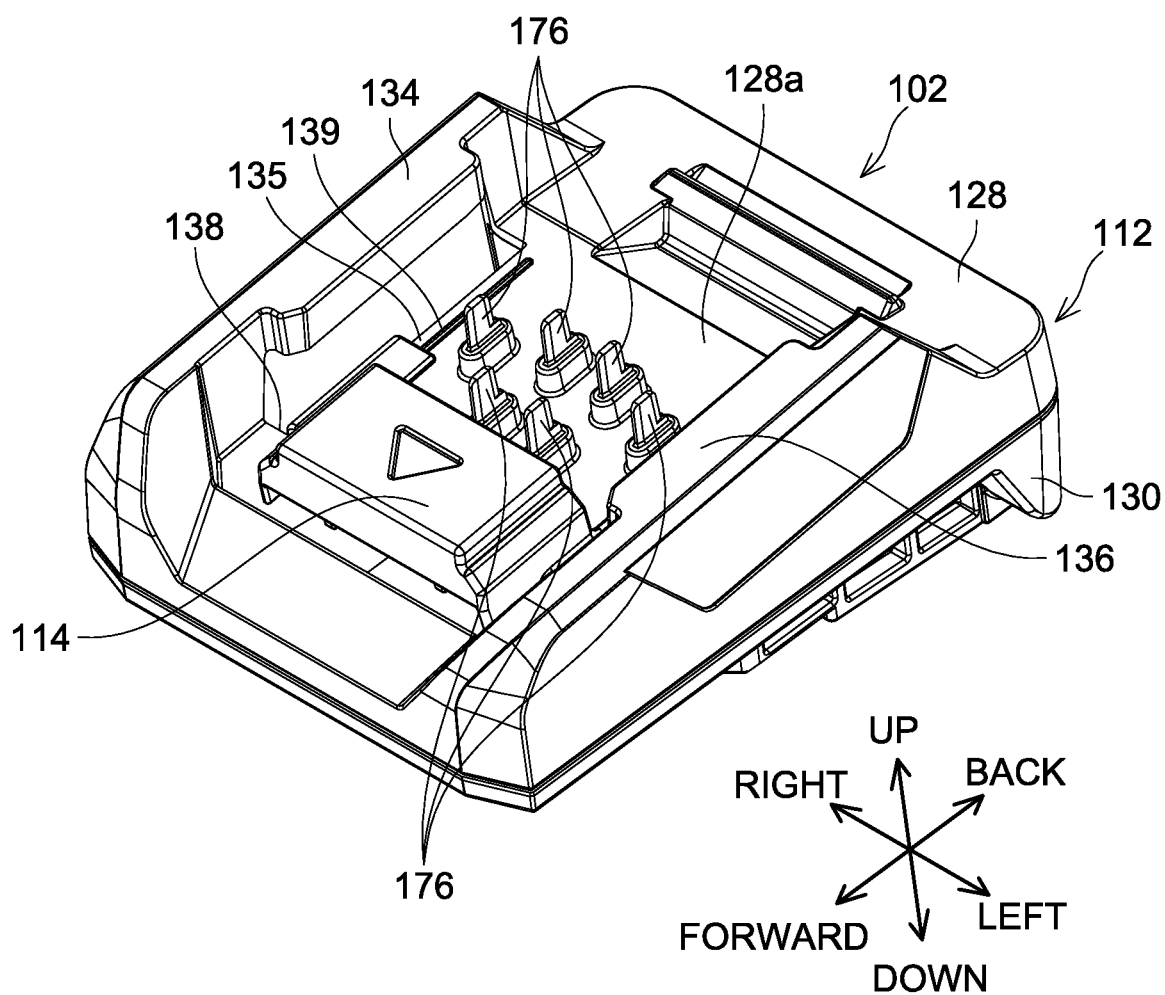
FIG. 17 is a perspective view showing the adapter 102 of the second embodiment when the terminal cover 114 is located in an exposure position.

As shown in FIGS. 16 and 17, the terminal cover 114 is held by the cover rails 135, 137 so as to slide in the sliding direction. The terminal cover 114 is configured to slide between a protection position for covering battery-side terminals 176 (see FIG. 16) and an exposure position for exposing the battery-side terminals 176 (see FIG. 17). The terminal cover 114 is biased in a direction from the exposure position toward the protection position by tension springs 126a, 126b (see FIG. 21). Due to this, in a state where the battery pack 104 is not attached to the adapter 102, the terminal cover 114 is held in the protection position by elastic restoring force of the tension springs 126a, 126b as shown in FIG. 16. When the battery pack 104 is to be attached to the adapter 102, the terminal cover 114 moves from the protection position to the exposure position by the terminal cover 114 being pressed by the battery pack 104.

Figure 24:
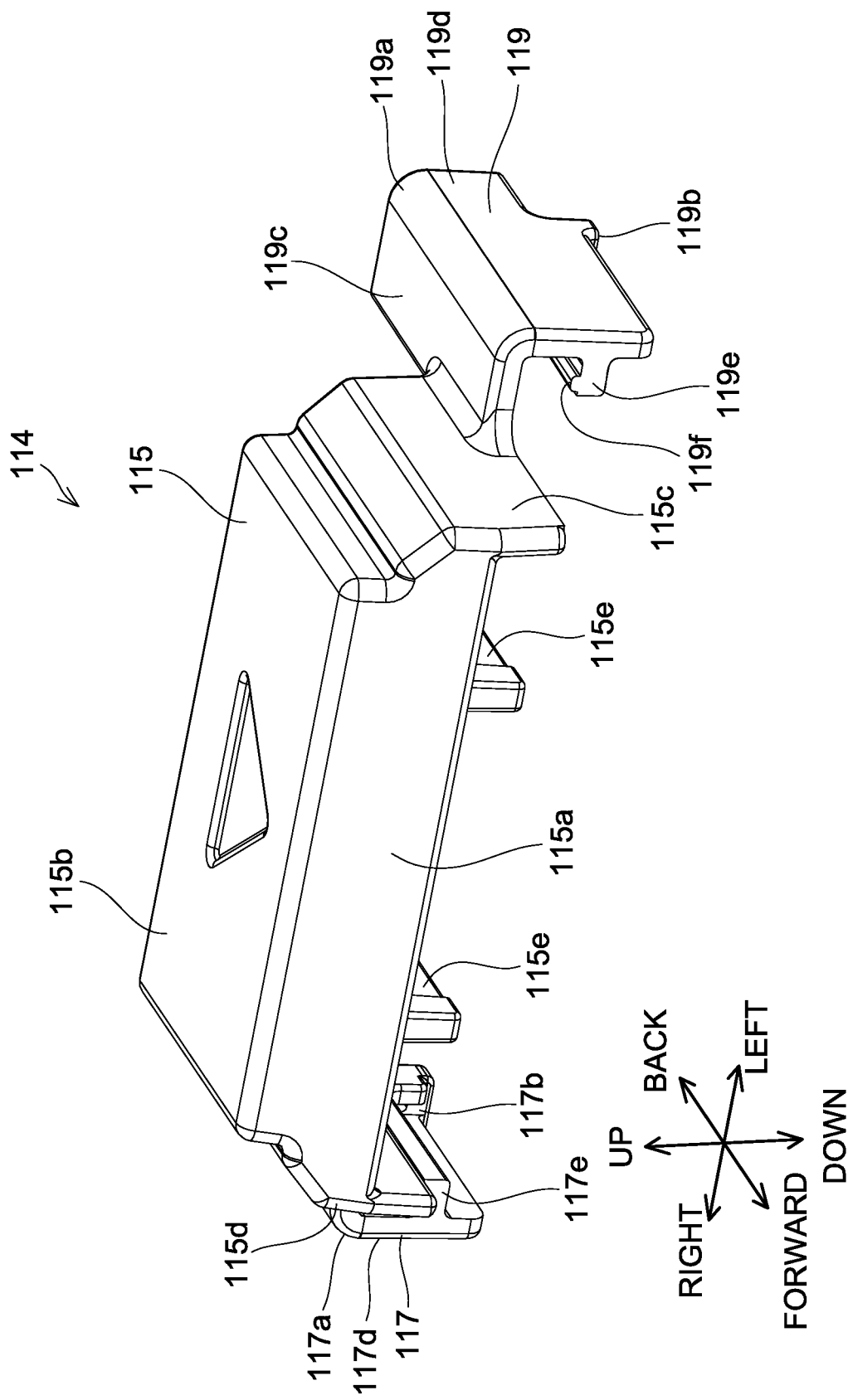
FIG. 24 is a perspective view showing the terminal cover 114 of the adapter 102 of the second embodiment from a front-left upper side.
Figure 25:
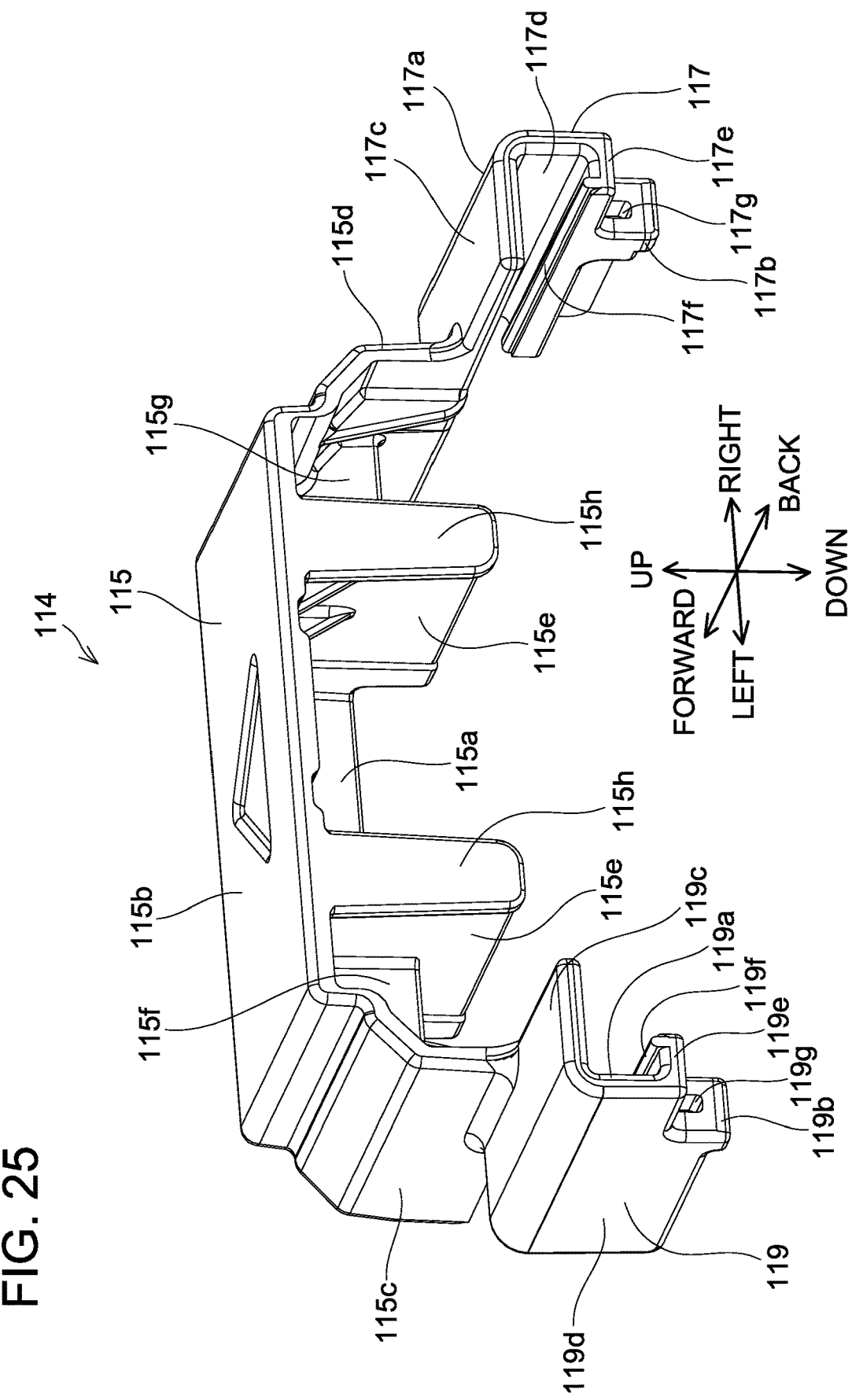
FIG. 25 is a perspective view showing the terminal cover 114 of the adapter 102 of the second embodiment from a rear-left upper side.

As shown in FIGS. 24, 25, the terminal cover 114 includes a cover body 115 and hooks 117, 119. The cover body 115 and the hooks 117, 119 are configured integrally. The cover body 115 includes a front plate 115a covering a front side of the battery-side terminals 176, an upper plate 115b covering an upper side of the terminals 176, a left plate 115c covering a left side of the terminals 176, a right plate 115d covering a right side of the terminals 176, partitioning plates 115e arranged between adjacent battery-side terminals 176, a reinforcing rib 115f arranged between the left plate 115c and the partitioning plates 115e, a reinforcing rib 115g arranged between the right plate 115d and the partitioning plates 115e, and reinforcing flanges 115h respectively provided on rear ends of the partitioning plates 115e. The left plate 115c, the right plate 115d, and the partitioning plates 115e of the cover body 115 are arranged along a plane including the sliding direction and the up-down direction. The reinforcing ribs 115f, 115g and the reinforcing flanges 115h are arranged along a plane orthogonal to the sliding direction.

The hook 117 is configured integrally with the right plate 115d of the cover body 115. The hook 117 includes an engaging portion 117a and a spring receptacle 117b. The engaging portion 117a includes an upper plate 117c, a right plate 117d extending downward from a right end of the upper plate 117c, and a lower plate 117e extending leftward from the right plate 117d. The upper plate 117c, the right plate 117d, and the lower plate 117e extend along the sliding direction. A ridge 117f extending along the sliding direction is provided on an upper surface of the lower plate 117e. The spring receptacle 117b protrudes downward from the lower plate 117e of the engaging portion 117a. A spring receiving hole 117g is formed in the spring receptacle 117b. The hook 119 is configured integrally with the left plate 115c of the cover body 115. The hook 119 includes an engaging portion 119a and a spring receptacle 119b. The engaging portion 119a includes an upper plate 119c, a left plate 119d extending downward from a left end of the upper plate 119c, and a lower plate 119e extending rightward from the left plate 119d. The upper plate 119c, the left plate 119d, and the lower plate 119e extend along the sliding direction. A ridge 119f extending along the sliding direction is provided on an upper surface of the lower plate 119e. The spring receptacle 119b protrudes downward from the lower plate 119e of the engaging portion 119a. A spring receiving hole 119g is formed in the spring receptacle 119b.

Figure 26:
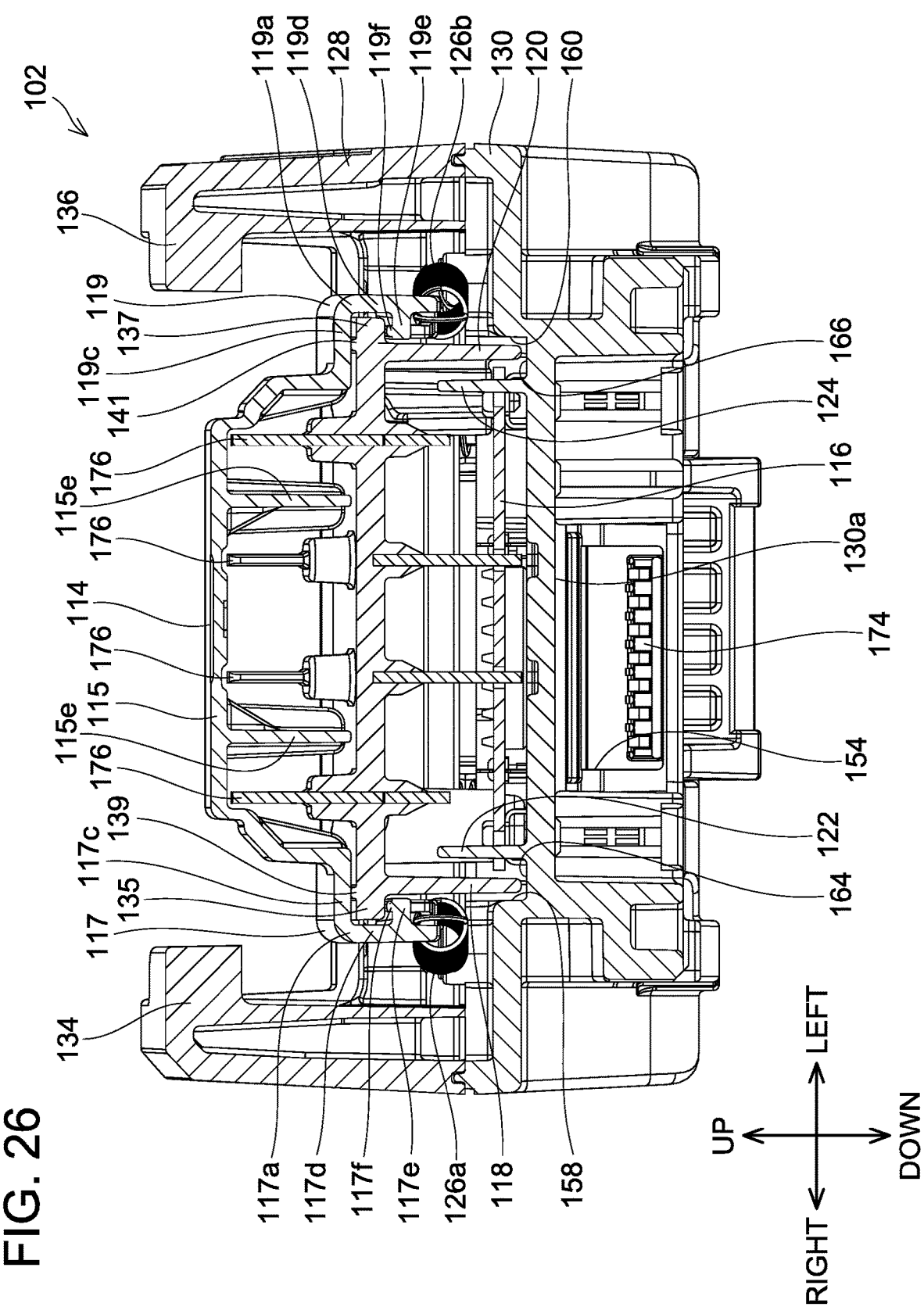
FIG. 26 is a cross-sectional view showing the adapter 102 of the second embodiment in a cross section orthogonal to a front-rear direction.

As shown in FIG. 26, the terminal cover 114 is attached to the upper housing 128 by elastically deforming the engaging portions 117a, 119a of the hooks 117,119 in a direction of opening the portions 117a, 119a outwardly and inserting the engaging portions 117a, 119a respectively into the through holes 138, 140. In a state of the terminal cover 114 being attached to the upper housing 128, the engaging portions 117a, 119a of the hooks 117, 119 engage with the cover rails 135, 137 so as to slide in the sliding direction. Due to this, the terminal cover 114 is held relative to the upper housing 128 so as to slide in the sliding direction.

In the state of the terminal cover 114 being attached to the upper housing 128, the terminal cover 114 is configured to move relative to the upper housing 128 downward to a position at which the ridges 139, 141 of the upper housing 128 contact the lower surfaces of the upper plates 117c, 119c of the hooks 117, 119 and upward to a position at which the ridges 117f, 119f of the hooks 117, 119 contact the cover rails 135, 137. Due to this, when the terminal cover 114 is to be slid in the sliding direction relative to the upper housing 128, scratches are generated on the lower surfaces of the upper plates 117c, 119c of the hooks 117, 119 and/or the lower surfaces of the cover rails 135, 137 by the sliding of the ridges 139, 141 and the ridges 117f, 119f, however, scratches are not generated on an external surface of the upper housing 128 and an external surface of the terminal cover 114. Due to this, even when the terminal cover 114 is slid repeatedly relative to the upper housing 128, an aesthetic appearance of the adapter 102 can be maintained in good state.

Figure 19:
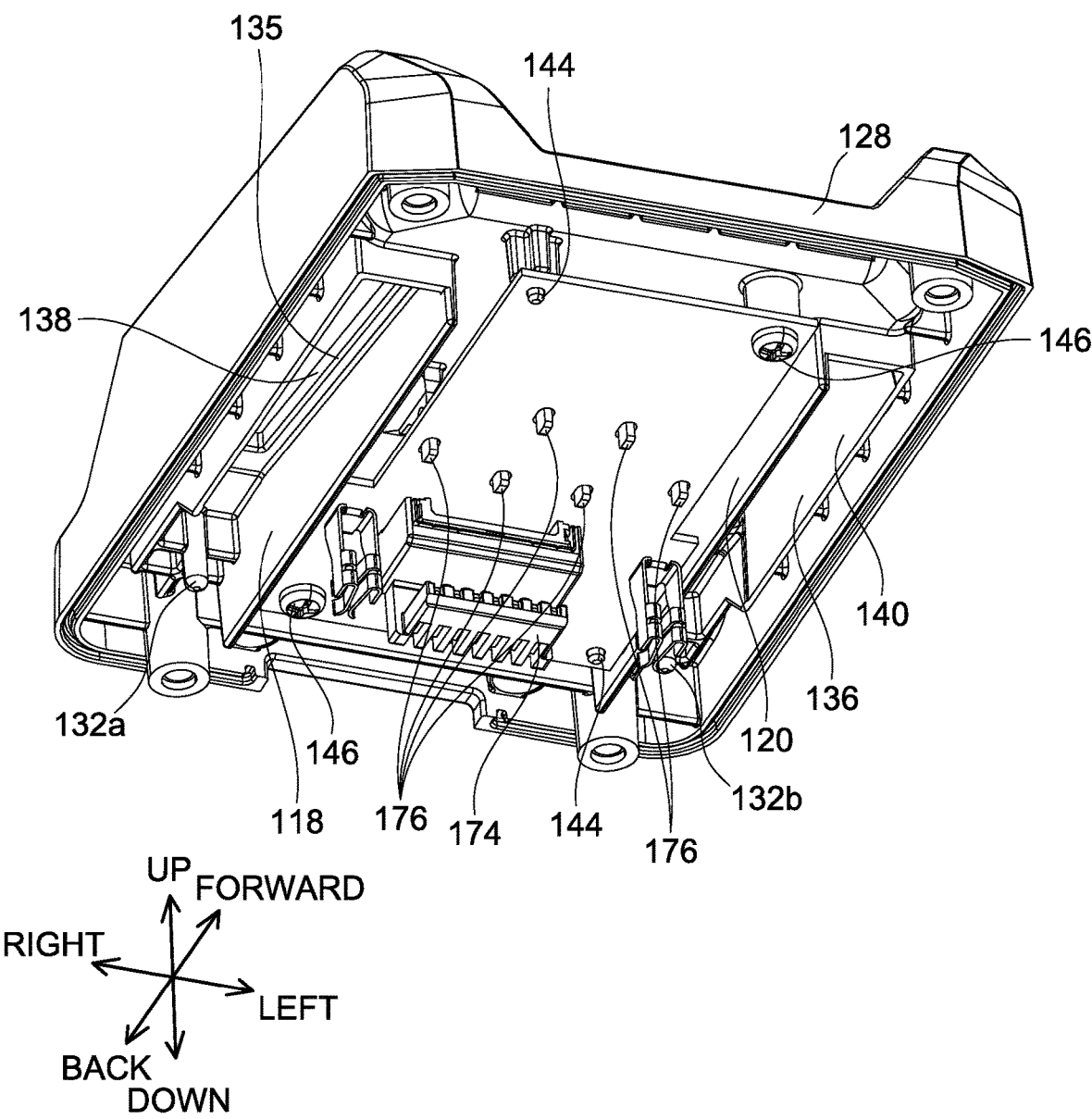
FIG. 19 is a perspective view showing from the front-right lower side how a control board 116 with device-side terminals 174 and battery-side terminals 176 mounted thereon is attached to the upper housing 128 of the second embodiment.

As shown in FIG. 20, the adapter 102 further includes a control board 116 and water guard walls 118, 120. The control board 116 and the water guard walls 118, 120 are housed inside the upper housing 128 and the lower housing 130. As shown in FIG. 19, the control board 116 is positioned relative to the upper housing 128 at two corners diagonally located among four corners by positioning pins 144 of the upper housing 128. Further, the control board 116 is fixed to the upper housing 128 at the other two corners diagonally located among the four corners by screws 146.

The water guard walls 118, 120 extend downward from an upper internal surface of the upper housing 128 (see FIG. 18). As shown in FIG. 20, the water guard wall 118 extends along the sliding direction on the left side from the cover rail 135 of the through hole 138. The water guard wall 118 is arranged to separate the through hole 138 from the control board 116. A lower end of the water guard wall 118 is arranged below the control board 116. The water guard wall 120 extends along the sliding direction on the right side from the cover rail 137 of the through hole 140. The water guard wall 120 is arranged to separate the through hole 140 from the control board 116. A lower end of the water guard wall 120 is arranged below the control board 116. The control board 116 is arranged between the water guard walls 118, 120 in the left-right direction. When water enters inside the housing 112 from the through holes 138, 140 respectively, the water guard walls 118, 120 guide the water that has entered to undersides of the water guard walls 118, 120, respectively.

Figure 21:
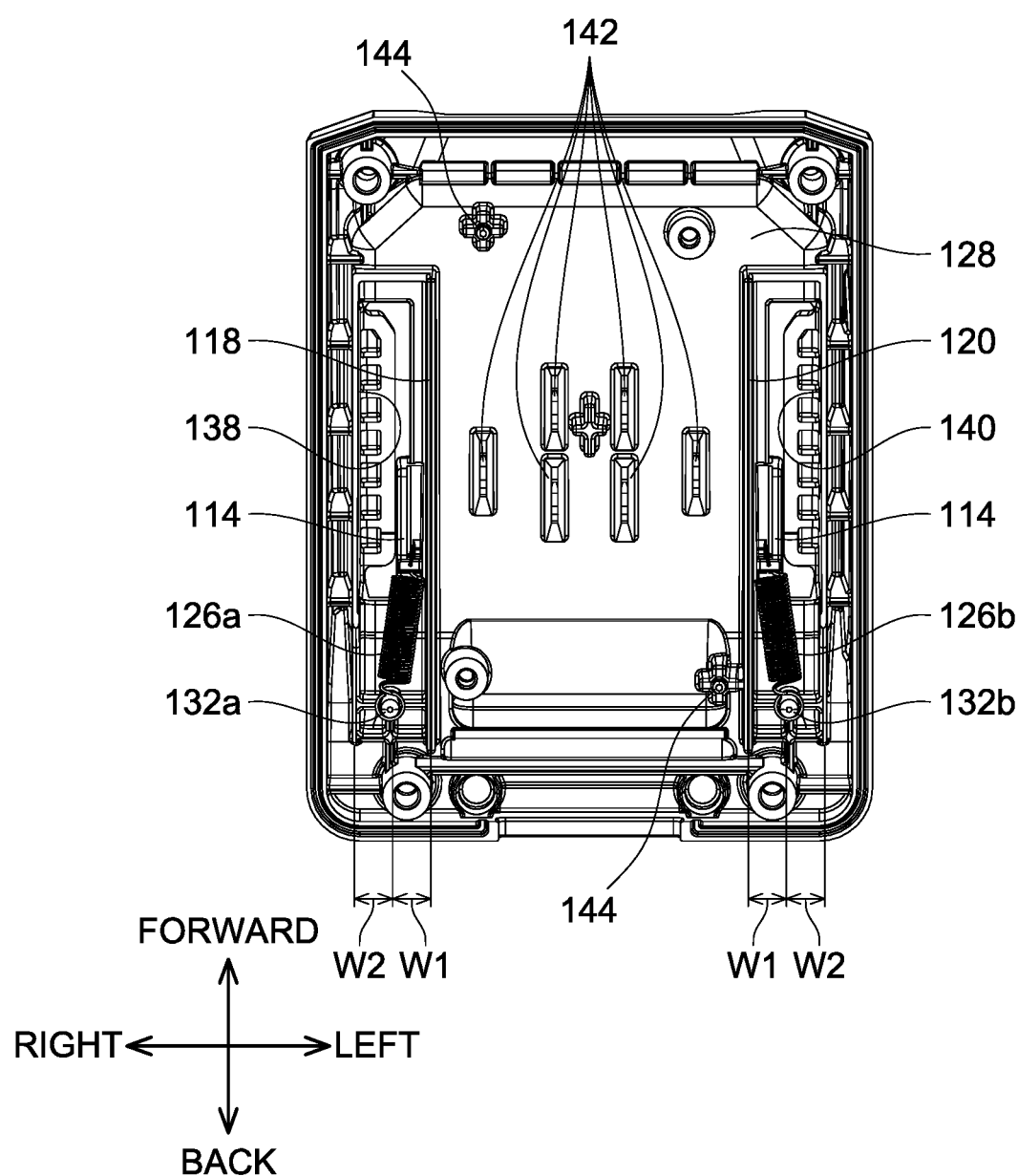
FIG. 21 is a bottom view showing from below the upper housing 128 of the second embodiment with tension springs 126a, 126b and the terminal cover 114 attached.

As shown in FIG. 21, pins 132a, 132b extending downward are provided on the upper internal surface of the upper housing 128. The pin 132a is arranged between the water guard wall 118 and a right-side edge of the through hole 138 in the left-right direction. A width W1 between the pin 132a and the water guard wall 118 is substantially same as a width W2 between the pin 132a and the right-side edge of the through hole 138 in the left-right direction. Further, the pin 132b is arranged between the water guard wall 120 and a left-side edge of the through hole 140 in the left-right direction. A width W1 between the pin 132b and the water guard wall 120 is substantially same as a width W2 between the pin 132b and the left-side edge of the through hole 140 in the left-right direction.

One end of the tension spring 126a is attached to the pin 132a. Another end of the tension spring 126a is attached to the spring receptacle 117b of the terminal cover 114. The tension spring 126a is inclined to separate away from the water guard wall 118 as the spring 126a extends from the front side to the rear side. If the position of the pin 132a is moved closer to the water guard wall 118 from the pin 132a of the present embodiment such that the tension spring 126a is arranged parallel to the front-rear direction, attachment performance of the tension spring 126a deteriorates as the tension spring 126a interferes with the water guard wall 118. Since the tension spring 126a is inclined to separate away from the water guard wall 118 as the spring 126a extends from the front side to the rear side, the tension spring 126a can be suppressed from interfering with the water guard wall 118 and accordingly, the deterioration of attachment performance of the tension spring 126a can be suppressed. Further, one end of the tension spring 126b is attached to the pin 132b. Another end of the tension spring 126b is attached to the spring receptacle 119b of the terminal cover 114. The tension spring 126b is inclined to separate away from the water guard wall 120 as the spring 126b extends from the front side to the rear side. The tension spring 126b can be suppressed from interfering with the water guard wall 120 and accordingly deterioration of attachment performance of the tension spring 126b can be suppressed.

As shown in FIG. 22, the lower housing 130 is provided with tester rails 150, 152 and a terminal receptacle 154. The tester rails 150, 152 have their longitudinal direction along the front-rear direction. The tester rail 150 is arranged on a right end of the lower surface 130a of the lower housing 130. The tester rail 152 is arranged on a left end of the lower surface 130a of the lower housing 130. The tester rails 150, 152 are longer than rails (not shown) of the battery-side attachment 104a of the battery pack 104. Such a configuration allows to avoid erroneous attachment of the adapter 102 to an electrical device other than the battery tester 106, such as to a power tool or power working machine. Further, the tester rail 152 extends farther forward and longer than a front end of the tester rail 150. Due to this, the adapter 102 can be attached and detached to and from the earlier-type battery tester 106, but cannot be attached and detached to and from the new-type battery tester 106. The tester rails 150, 152 guide the tester-side attachment 106a in the sliding direction when the tester-side attachment 106a of the battery tester 106 is attached to the tester receptacle 108 of the adapter 102. The terminal receptacle 154 is arranged between the tester rails 150, 152.

The adapter 102 further comprises a hook 180. The hook 180 is arranged at a rear end of the adapter 102. The hook 180 protrudes downward from the lower surface 130a of the lower housing 130 in a normal state by being biased by a compression spring 182 (see FIG. 23). The hook 180 has its longitudinal direction along the up-down direction. The adapter 102 is held by the battery tester 106 by the hook 180 engaging with an engaging groove (not shown) formed on the upper surface of the battery tester 106.

As shown in FIG. 20, the adapter 102 further comprises internal walls 122, 124. The internal walls 122, 124 are housed inside the upper housing 128 and the outer housing 130. The internal walls 122, 124 extend upward from a lower internal surface of the lower housing 130. The internal walls 122, 124 have their longitudinal direction along the front-rear direction. The internal wall 122 is arranged on the left side from the water guard wall 118, and on the right side from the control board 116. Further, an upper end of the internal wall 122 is arranged above the control board 116 and the lower end of the water guard wall 118. The internal wall 124 is arranged on the right side from the water guard wall 120, and on the left side from the control board 116. Further, an upper end of the internal wall 124 is arranged above the control board 116 and a lower end of the water guard wall 120. The control board 116 is arranged between the internal walls 122, 124 in the left-right direction. Further, the internal walls 122, 124 are arranged between the water guard walls 118, 120 in the left-right direction. The internal walls 122, 124 and the water guard walls 118, 120 constitute a labyrinth structure by the internal wall 122 overlapping the water guard wall 118, and further the internal wall 124 overlapping the water guard wall 120 in the left-right direction. Such a configuration can further suppress the water that has entered into the housing 112 from each of the through holes 138, 140 from arriving at the control board 116 as compared to a case where the adapter 102 includes only one of the water guard wall 118 and the internal wall 122 (on the right side) and only one of the water guard wall 120 and the internal wall 124 (on the left side).

Steps 158, 160 are provided on internal surfaces of the lower housing 130. The step 158 is arranged on the right side from both the internal wall 122 and the water guard wall 118. A lower internal surface of the lower housing 130 which is on the right side from the step 158 is arranged above the lower internal surface positioned between the step 158 and the internal wall 122. A water guard groove 164 is formed between the step 158 and the internal wall 122. The step 160 is arranged on the left side from both the internal wall 124 and the water guard wall 120. The lower internal surface of the lower housing 130 which is on the left side from the step 160 is arranged above the lower internal surface positioned between the step 160 and the internal wall 124. A water guard groove 166 is formed between the step 160 and the internal wall 124. The water guard grooves 164, 166 have their longitudinal direction along the front-rear direction. The lower end of the water guard wall 118 is arranged inside the water guard groove 164. Further, the lower end of the water guard wall 120 is arranged inside the water guard groove 166. Each of the water guard grooves 164, 166 is configured to receive water that has been guided by the corresponding water guard wall 118, 120.

The lower housing 130 is provided with exhaust ports 168, 170. The exhaust port 168 is arranged at a front end of the water guard groove 164. Further, the exhaust port 170 is arranged at a front end of the water guard groove 166.

When the adapter 102 is attached to the battery tester 106 placed on a horizontal plane, the lower surface 130a of the lower housing 130 is inclined relative to the horizontal plane so as to approach the lower side from the upper side as the lower surface 130a extends from the rear side to the front side. Due to this, the water guard grooves 164, 166 are inclined relative to the horizontal plane so as to approach the lower side from the upper side as the grooves 164, 166 extend from the rear side to the front side. Such a configuration allows water that has dripped from the water guard walls 118, 120 to the water guard grooves 164, 166 to flow forward and to be drained to the outside of the housing 112 through the exhaust ports 168, 170. The water that has drained from the exhaust ports 168, 170 runs over an external surface of the battery tester 106, and drips off to an underside of the battery tester 106.

Further, also when the adapter 102 is placed on the horizontal plane, the lower surface 130a of the lower housing 130 is inclined relative to the horizontal plane so as to approach the lower side from the upper side as the surface 130a extends from the rear side toward the front side. Due to this, the water guard grooves 164, 166 are inclined relative to the horizontal plane so as to approach the lower side from the upper side as the grooves 164, 166 extend from the rear side to the front side. Such a configuration allows the water that has moved from the water guard walls 118, 120 to the water guard grooves 164, 166 to flow forward, and be drained from the exhaust ports 168, 170 to the outside of the housing 112.

Figure 23:
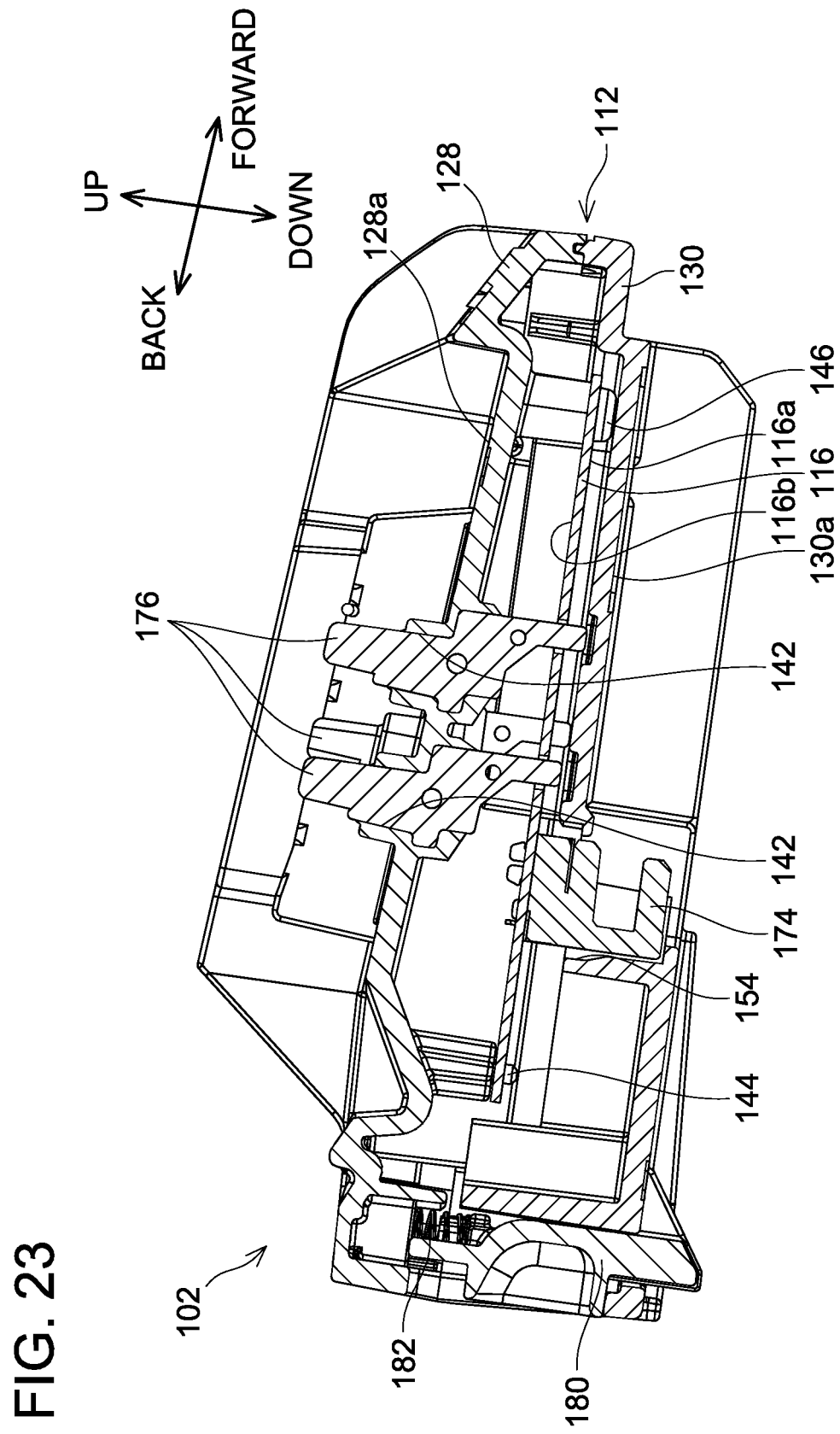
FIG. 23 is a cross-sectional view showing in a cross section orthogonal to a left-right direction the adapter 102 of the second embodiment with the terminal cover 114 detached therefrom.

As shown in FIG. 23, the control board 116 is arranged parallel to the lower surface 130a of the lower housing 130. The control board 116 is inclined relative to the upper surface 128a of the upper housing 128. In the present embodiment, the upper surface 128a of the upper housing 128 is inclined at 5 degrees relative to the lower surface 130a of the lower housing 130. Alternatively, the upper surface 128a of the upper housing 128 may be inclined relative to the lower surface 130a of the lower housing 130 at a degree greater than zero and equal to or smaller than 10, or may be inclined at a degree greater than zero and equal to or smaller than 15.

A device-side terminal 174 is mounted on a lower surface 116a of the control board 116. The device-side terminal 174 has a shape of extending downward from the lower surface 116a of the control board 116 and then curving to extend forward. The device-side terminal 174 protrudes outside of the lower housing 130 through the terminal receptacle 154 of the lower housing 130. When the adapter 102 is attached to the battery tester 106, the device-side terminal 174 is electrically connected to terminal(s) (not shown) of the battery tester 106.

Battery-side terminals 176 are mounted on an upper surface 116b of the control board 116. The battery-side terminals 176 protrude outside of the upper housing 128 via the terminal receptacles 142 of the upper housing 128. When the adapter 102 is attached to the battery pack 104, the battery-side terminals 176 are electrically connected to terminals (not shown) of the battery pack 104.

Third Embodiment

Figure 27:
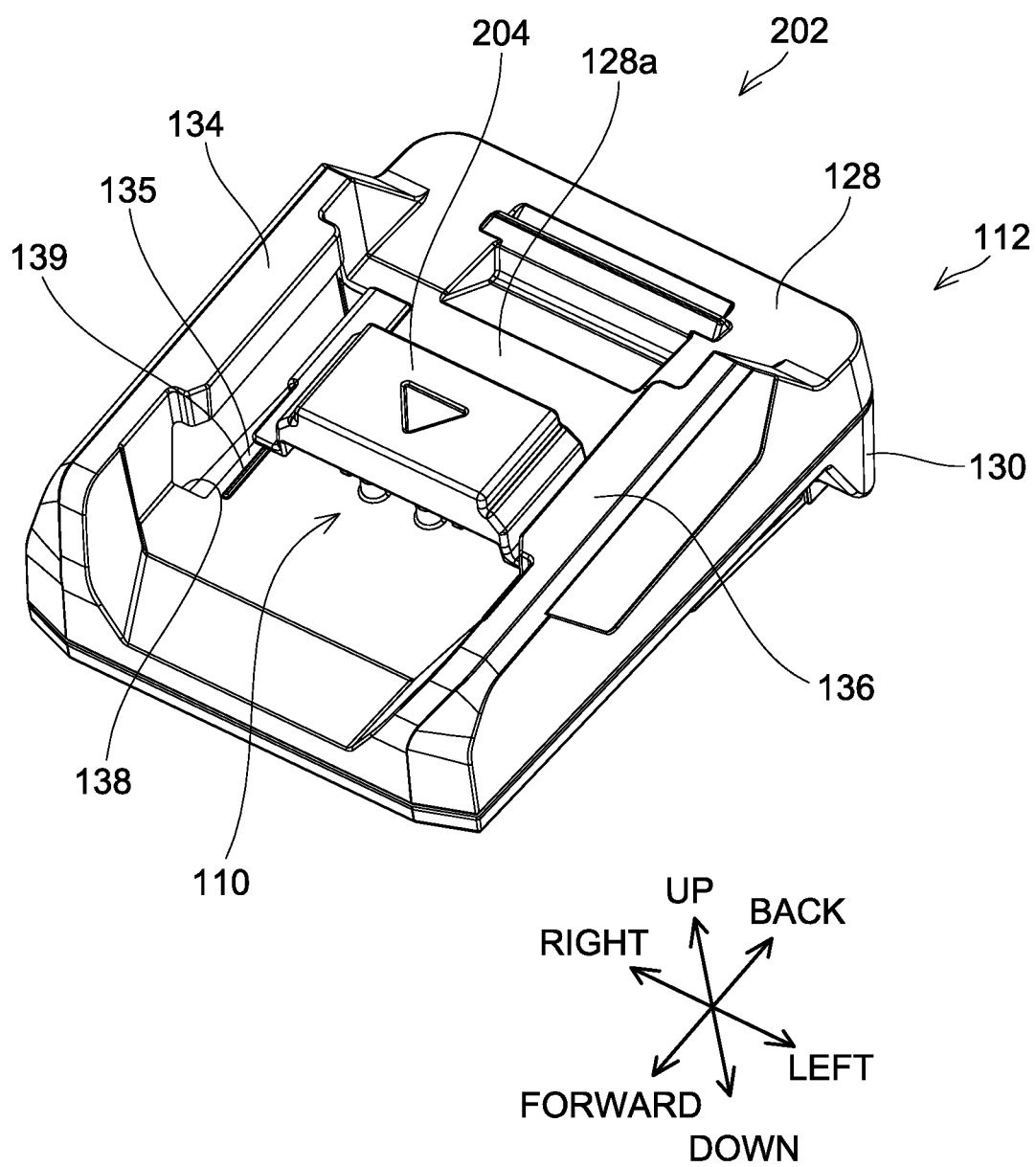
FIG. 27 is a perspective view showing an adapter 202 of a third embodiment from the front-left upper side.

An adapter 202 of a third embodiment will be described with reference to FIGS. 27 and 28. As shown in FIG. 27, the adapter 202 of the present embodiment has a substantially same configuration as that of the adapter 102 of the second embodiment. The adapter 202 of the present embodiment comprises a terminal cover 204 instead of the terminal cover 114.

Figure 28:
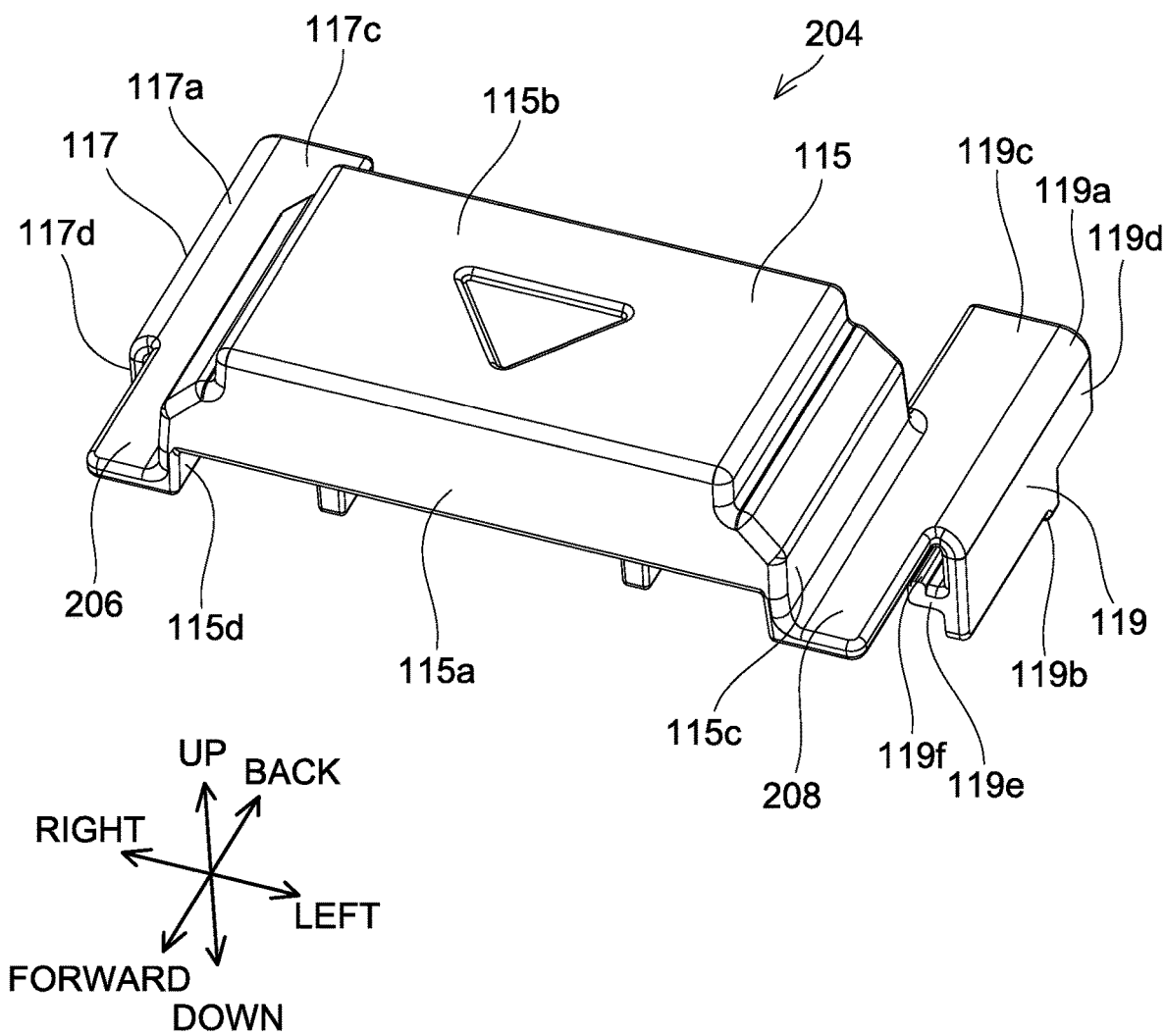
FIG. 28 is a perspective view showing a terminal cover 204 of the adapter 202 of the third embodiment from the front-left upper side.

As shown in FIG. 28, the terminal cover 204 of the present embodiment has a substantially same configuration as that of the terminal cover 114 of the second embodiment.

The terminal cover 204 of the present embodiment comprises a cover body 115, hooks 117, 119, and cover plates 206, 208.

The cover plate 206 is arranged on a same plane as an upper plate 117c of the hook 117. The cover plate 206 extends from a front plate 115a of the cover body 115 to an upper plate 117c of the hook 117. The cover plate 208 is arranged on a same plane as an upper plate 119c of the hook 119. The cover plate 208 extends from the front plate 115a of the cover body 115 to the upper plate 119c of the hook 119.

As shown in FIG. 27, in a state of the terminal cover 204 being attached to an upper housing 128, the cover plate 206 and the upper plate 117c of the hook 117 are arranged to face a ridge 139 of the upper housing 128, and the cover plate 208 and the upper plate 119c of the hook 119 are arranged to face a ridge 141 of the upper housing 128. Such a configuration reduces shaking of the terminal cover 204 when force of rotating the terminal cover 204 relatively to the upper housing 128 with the left-right direction as its rotating axis is applied, as compared to the adapter 102 of the second embodiment. Due to this, even when the force of rotating the terminal cover 204 relatively to the upper housing 128 with the left-right direction as the rotating axis acts, the battery-side terminals 176 can be suppressed from contacting the front plate 115a or the upper plate 115b of the cover body 115.

In one or more aspects of the present teachings, the adapter 102, 202 (example of an electrical device) comprises: the housing 112 to which the battery pack 104 is attached detachably by sliding the battery pack 104 in a sliding direction; the battery-side terminals 176 (example of a battery connection terminal) configured to be electrically connected to the battery pack 104 attached to the housing 112; and the terminal cover 114, 204 configured to move between a protection position for protecting the battery-side terminals 176 and an exposure position for exposing the battery-side terminals 176. The housing 112 includes the cover rails 135, 137 extending along the sliding direction. The terminal cover 114, 204 includes: the cover body 115 having a shape that at least partially covers the battery-side terminals 176; and the hooks 117, 119 formed integrally with the cover body 115. The hooks 117, 119 are engaged with the cover rails 135, 137 so as to slide in the sliding direction.

According to the above adapter 102, 202, the terminal cover 114, 204 can be assembled to the housing 112 by engaging the hooks 117, 119, which are formed integrally with the cover body 115, with the cover rails 135, 137. Since screwing work is not required when assembling the terminal cover 114, 204 to the housing 112, assembling work or repairing work can be performed easily.

In one or more aspects of the present teachings, the cover rails 135, 137 include a first cover rail 135 and a second cover rail 137. The hooks 117, 119 include a first hook 117 engaged with the first cover rail 135 so as to slide in the sliding direction and a second hook 119 engaged with the second cover rail 137 so as to slide in the sliding direction.

According to the above configuration, each of the first hook 117 and the second hook 119 engages so as to slide with the corresponding one of the first cover rail 135 and the second cover rail 137, the terminal cover 114, 204 can be suppressed from shaking when sliding the terminal cover 114, 204 relative to the housing 112. The terminal cover 114, 204 can be smoothly slid relative to the housing 112.

In one or more aspects of the present teachings, the battery-side terminals 176 are disposed between the first cover rail 135 and the second cover rail 137.

According to the above configuration, an area occupied by the battery-side terminals 176, the terminal cover 114, 204, and the cover rails 135, 137 can be made smaller in the sliding direction.

In one or more aspects of the present teachings, the adapter 102, 202 further comprises the tension springs 126a, 126b housed inside the housing 112. The terminal cover 114, 204 is biased in a direction from the exposure position toward the protection position by elastic restoring force of the tension springs 126a, 126b.

In one or more aspects of the present teachings, the adapter 102, 202 (example of an electrical device) comprises: the housing 112 to which the battery pack 104 is attached detachably by sliding the battery pack 104 in a sliding direction; the battery-side terminals 176 (example of a battery connection terminal) configured to be electrically connected to the battery pack 104 attached to the housing 112; the terminal cover 114, 204 configured to move between a protection position for protecting the battery-side terminals 176 and an exposure position for exposing the battery-side terminals 176; and the tension springs 126a, 126b housed inside the housing 112. The terminal cover 114, 204 is biased in a direction from the exposure position toward the protection position by elastic restoring force of the tension springs 126a, 126b.

In a configuration where the terminal cover 114, 204 is biased in the direction from the exposure position toward the protection position by the elastic restoring force of compression spring(s), there is a risk that one or more of the compression spring(s) may contact surrounding part(s), which may cause noise or damage the compression spring(s) or the surrounding part(s) when buckling distortion of the compression spring(s) occurs. According to the above configuration, since the terminal cover 114, 204 is biased in the direction from the exposure position toward the protection position by the elastic restoring force of the tension springs 126a, 126b, the noise generation or damage of part(s) caused by the buckling distortion of the spring(s) can be suppressed.

In one or more aspects of the present teachings, the cover rails 135, 137 are formed at the edge portions of the through holes 138, 140 formed on the housing 112. The hooks 117, 119 have a shape protruding from the cover body 115 in a direction in which the terminal cover 114, 204 moves from the exposure position to the protection position.

When the cover rails 135, 137 are formed in the edge portions of the through holes 138, 140 formed on the housing 112, there is a risk that water or foreign matter enters from outside of the housing 112 through the through hole(s) 138, 140, thus a movement of the tension spring(s) 126a, 126b may be affected in a state where the battery pack 104 is not installed. According to the above configuration, since the terminal cover 114, 204 has the shape protruding from the cover body 115 in the direction in which the terminal cover 114, 204 moves from the exposure position toward the protection position, the hooks 117, 119 can cover the tension springs 126a, 126b from the outside of the housing 112 even in the state where the battery pack 104 is not installed. In the state where the battery pack 104 is not installed, water or foreign matter can be suppressed from entering from the outside of the housing 112 through the through hole(s) 138, 140, and the movement of the tension spring(s) 126a, 126b can be suppressed from being affected thereby.

In one or more aspects of the present teachings, the ridges 139, 141 extending along the sliding direction may be provided on outer surfaces of the cover rails 135, 137.

If the hooks 117, 119 slide repeatedly relative to the cover rails 135, 137 when the ridges 139, 141 as aforementioned are not provided on the outer surfaces of the cover rails 135, 137, there is a risk that scratches may be formed on the outer surfaces of the cover rails 135, 137 and consequently an aesthetic appearance of the adapter 102, 202 may be impaired. According to the above configuration, the scratches can be suppressed from being formed on the outer surfaces of the cover rails 135, 137 even when the hooks 117, 119 slide relative to the cover rails 135, 137 repeatedly, and thus the aesthetic appearance of the adapter 102, 202 can be maintained.

In one or more aspects of the present teachings, the terminal cover 204 may further include the cover plates 206, 208 formed integrally with the hooks 117, 119 and extending along outer surfaces of the cover rails 135, 137. The cover plates 206, 208 may have their longitudinal direction along the sliding direction.

According to the above configuration, the terminal cover 204 can be suppressed from shaking relative to the housing 112 even when force in a rotating direction which moves vertically an end of the terminal cover 204 located along the sliding direction is applied on the terminal cover 204, and consequently the terminal cover 204 can be suppressed from contacting the battery-side terminals 176.

In one or more aspects of the present teachings, the cover body 115 may include the reinforcing ribs 115f, 115g and the reinforcing flanges 115g (examples of a reinforcing member) along a plane orthogonal to the sliding direction.

According to the above configuration, rigidity of the cover body 115 in a direction orthogonal to the sliding direction can be improved. Such a configuration allows to suppress the cover body 115 from deforming even when an impact is applied on the cover body 115, and accordingly suppress the cover body 115 from contacting the battery-side terminals 176.

What is claimed is:

1. An electrical device, comprising:
    a housing to which a battery pack is attached detachably by sliding the battery pack in a sliding direction;
    a battery connection terminal configured to be electrically connected to the battery pack attached to the housing; and
    a terminal cover configured to move between a protection position for protecting the battery connection terminal and an exposure position for exposing the battery connection terminal,
    wherein
    the housing includes a cover rail extending along the sliding direction,
    the terminal cover includes:
    a cover body having a shape that at least partially covers the battery connection terminal; and
    a hook formed integrally with the cover body, and
    the hook is engaged with the cover rail so as to slide in the sliding direction.

2. The electrical device according to claim 1, wherein the cover rail includes a first cover rail and a second cover rail, and
    the hook includes a first hook engaged with the first cover rail so as to slide in the sliding direction and a second hook engaged with the second cover rail so as to slide in the sliding direction.

3. The electrical device according to claim 2, wherein the battery connection terminal is disposed between the first cover rail and the second cover rail.

4. The electrical device according to claim 1, wherein the housing further includes a cover detachment prevention member configured to prevent the hook from moving and/or deforming in such a way as to cause the hook to be disengaged from the cover rail.

5. The electrical device according to claim 1, further comprising a tension spring housed inside the housing, wherein
the terminal cover is biased in a direction from the exposure position toward the protection position by elastic restoring force of the tension spring.

6. The electrical device according to claim 5, wherein
one end of the tension spring is held by the terminal cover,
another end of the tension spring is held by the housing, and
the housing further includes:
a columnar member configured to hold the other end of the tension spring; and
a stopper member configured to prevent the other end from moving along an axial direction of the columnar member.

7. The electrical device according to claim 5, wherein the housing further includes a tension spring housing member disposed so as to surround a periphery of the tension spring inside the housing.

8. The electrical device according to claim 5, wherein the cover rail is formed at an edge of a through hole formed on the housing, and
the hook has a shape protruding from the cover body in a direction in which the terminal cover moves from the exposure position to the protection position.

9. The electrical device according to claim 1, wherein a ridge extending along the sliding direction is provided on an outer surface of the cover rail.

10. The electrical device according to claim 1, wherein the terminal cover further includes a cover plate formed integrally with the hook and extending along an outer surface of the cover rail, and
the cover plate has a longitudinal direction along the sliding direction.

11. The electrical device according to claim 1, wherein the cover body includes a reinforcing member along a plane orthogonal to the sliding direction.

* * * * *